(12) United States Patent
Liu et al.

(10) Patent No.: US 12,426,012 B2
(45) Date of Patent: Sep. 23, 2025

(54) RESOURCE DETERMINING METHOD AND APPARATUS

(71) Applicant: Huawei Technologies Co., Ltd., Shenzhen (CN)

(72) Inventors: Yun Liu, Shenzhen (CN); Haibo Xu, Beijing (CN); Zhou Wang, Shenzhen (CN); Yongxing Zhou, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 410 days.

(21) Appl. No.: 17/912,743

(22) PCT Filed: Mar. 19, 2021

(86) PCT No.: PCT/CN2021/081797
§ 371 (c)(1),
(2) Date: Sep. 19, 2022

(87) PCT Pub. No.: WO2021/185353
PCT Pub. Date: Sep. 23, 2021

(65) Prior Publication Data
US 2023/0217419 A1 Jul. 6, 2023

(30) Foreign Application Priority Data
Mar. 20, 2020 (CN) .......................... 202010199650.9
Jun. 30, 2020 (CN) .......................... 202010624349.8

(51) Int. Cl.
*H04W 72/04* (2023.01)
*H04W 24/10* (2009.01)
(Continued)

(52) U.S. Cl.
CPC ........... *H04W 72/04* (2013.01); *H04W 72/40* (2023.01); *H04W 72/54* (2023.01); *H04W 72/56* (2023.01)

(58) Field of Classification Search
CPC ..... H04W 72/02; H04W 24/10; H04W 72/51; H04W 72/04; H04W 76/14; H04W 72/20;
(Continued)

(56) References Cited

U.S. PATENT DOCUMENTS 10,028,223 B2 * 7/2018 Woo ................... H04W 52/0245
10,764,902 B2 * 9/2020 Seo ........................ H04W 72/02
(Continued)

FOREIGN PATENT DOCUMENTS

CN 109392134 A 2/2019
CN 109803321 A 5/2019
(Continued)

OTHER PUBLICATIONS

Qualcomm Incorporated, "Sidelink Resource Allocation Mechanism for NR V2X", R1-1913293, 3GPP TSG-RAN WG1 #98bis, Nov. 18-22, 2019. Reno, USA, 10 pages.
(Continued)

*Primary Examiner* — Sai Aung
(74) *Attorney, Agent, or Firm* — Conley Rose, P.C.

(57) ABSTRACT

A resource determining method includes obtaining, by a terminal device, resource information, determining, by the terminal device, a first resource jointly reserved by N services, where N is greater than or equal to 2, and determining whether to use the first resource as a candidate resource based on signal strength thresholds of the N services and signal strength of the N services.

20 Claims, 9 Drawing Sheets

(51) Int. Cl.
*H04W 72/12* (2023.01)
*H04W 72/40* (2023.01)
*H04W 72/54* (2023.01)
*H04W 72/56* (2023.01)

(58) Field of Classification Search
CPC ....... H04W 72/23; H04W 4/40; H04W 72/56; H04W 4/70; H04W 92/18; H04W 88/06; H04W 4/46; H04W 72/21
See application file for complete search history.

(56) References Cited

U.S. PATENT DOCUMENTS

| | | | |
|---|---|---|---|
| 2019/0200366 A1 | 6/2019 | Park et al. | |
| 2019/0342893 A1 | 11/2019 | Zhao et al. | |
| 2019/0387377 A1 | 12/2019 | Zhang et al. | |
| 2020/0029245 A1* | 1/2020 | Khoryaev | H04W 36/22 |
| 2020/0059918 A1* | 2/2020 | Lu | H04W 72/51 |
| 2020/0187162 A1* | 6/2020 | Luo | H04W 72/02 |
| 2021/0306828 A1* | 9/2021 | Panteleev | H04W 72/0446 |
| 2022/0256524 A1* | 8/2022 | Kwon | H04W 72/12 |
| 2022/0330265 A1 | 10/2022 | Luo et al. | |

FOREIGN PATENT DOCUMENTS

| | | |
|---|---|---|
| CN | 110115059 A | 8/2019 |
| CN | 110139240 A | 8/2019 |
| CN | 110536354 A | 12/2019 |
| WO | 2017026977 A1 | 2/2017 |

OTHER PUBLICATIONS

"3rd Generation Partnership Project; Technical Specification Group Radio Access Network; NR; Physical layer procedures for data (Release 16)", 3GPP TS 38.214, 3 V16.0.0, Dec. 2019, 147 pages, XP051860777.

* cited by examiner

RESOURCE DETERMINING METHOD AND APPARATUS

CROSS-REFERENCE TO RELATED APPLICATIONS

This application claims priority to Chinese Patent Application No. 202010199650.9, filed with the China National Intellectual Property Administration on Mar. 20, 2020 and entitled "SENSING METHOD FOR PERIODIC AND APERIODIC RESERVATION SERVICES", which is incorporated herein by reference in its entirety. This application claims priority to Chinese Patent Application No. 202010624349.8, filed with the China National Intellectual Property Administration on Jun. 30, 2020 and entitled "RESOURCE DETERMINING METHOD AND APPARATUS", which is incorporated herein by reference in its entirety.

TECHNICAL FIELD

This application relates to the field of communication technologies, and in particular, to a resource determining method and an apparatus.

BACKGROUND

In a current mobile communication technology, such as a sidelink (sidelink) communication scenario, a terminal device (UE) is supported in sensing another peripheral terminal device. UE that performs sensing can receive data transmitted by another nearby UE, to learn, based on the received data, of a resource used by the nearby UE. In this way, sidelink (sidelink, SL) data transmission (or referred to as sidelink transmission) can be avoided on a resource on which data transmission is sensed, to reduce interference from a channel during SL transmission. One of objectives of sensing is to learn of a reservation status of another nearby UE for a transmission resource, to properly select a transmission resource to be used by the UE to transmit data by using an SL.

When the transmission resource is reserved by a plurality of services, the UE cannot properly determine whether to transmit data on the transmission resource, and optimization is required.

SUMMARY

This application provides a resource determining method and an apparatus, to meet requirements of different types of UE for sidelink transmission.

According to a first aspect, an embodiment of this application provides a resource determining method, and the method may be performed by a terminal device that supports sidelink transmission or a component (such as a processor, a chip, or a chip system) in the terminal device.

An example in which the method is performed by the terminal device is used below for description. Based on the method, the terminal device may obtain resource information of at least N services of a plurality of second terminal devices. The resource information may include information of a first resource, the first resource is a resource that is jointly reserved by N services, and N is greater than or equal to 2. The terminal device may further determine signal strength thresholds of the N services based on the information of the first resource, and determine signal strength of the N services based on signal strength of resource information of the N received services. When the signal strength thresholds of the N services and the signal strength of the N services meet a first condition, the terminal device may determine that a candidate resource set includes the first resource.

In the foregoing method, the terminal device may properly determine, based on the signal strength thresholds of the N services and the signal strength of the N services, whether to use the first resource jointly reserved by the N services as a candidate resource, so that the terminal device considers to select the candidate resource as a sidelink transmission resource. Therefore, the terminal device can select a resource with relatively low interference based on the candidate resource for sidelink transmission, and interference suffered from in sidelink transmission is reduced, and therefore sidelink transmission performance is improved.

In a possible design, the information of the first resource includes at least one of priority information of the N services, an index of the first resource, time-frequency location information of the first resource, or type information of the N services. The priority information of the N services may be used by the terminal device to determine the signal strength thresholds of the N services. The index of the first resource and the time-frequency location information of the first resource are used by the terminal device to perform data transmission by using the first resource. The type information of the N services may be used by the terminal device to determine types of the N services, to identify whether the N services are periodic services or aperiodic services.

In a possible design, the information of the first resource includes the priority information of the N services, and the terminal device may determine the signal strength thresholds of the N services based on the priority information of the N services, to improve determining efficiency of the signal strength threshold.

In a possible design, the terminal device may determine a first signal strength threshold based on the signal strength thresholds of the N services. The first signal strength threshold includes a signal strength threshold of a service with a highest priority in the N services, a signal strength threshold of a service with a smallest difference between a signal strength threshold and signal strength in the N services, or a minimum signal strength threshold in signal strength thresholds of m services, where the m services are some or all services in the N services, m is a positive integer, and m is less than or equal to N. With this design, a more flexible manner of determining the first signal strength threshold can be implemented.

In a possible design, the terminal device may further determine a second signal strength threshold based on the signal strength thresholds of the N services, and determine a first signal strength threshold based on the second signal strength threshold and a value M, where the first signal strength threshold is a signal strength threshold of one of the N services. M is a constant, or M is determined based on N. The second signal strength threshold includes a signal strength threshold of a service with a highest priority in the N services, a signal strength threshold of a service with a smallest difference between a signal strength threshold and signal strength in the N services, or a minimum signal strength threshold in signal strength thresholds of m services, where the m services are some or all services in the N services, m is a positive integer, and m is less than or equal to N. With this design, a more flexible manner of determining the first signal strength threshold can be implemented.

In a possible design, the first signal strength is determined based on signal strength of the service with the highest priority in the N services; the first signal strength is determined based on signal strength of a service with a minimum signal strength threshold in the N services; the first signal strength is determined based on signal strength of a service with a smallest difference between a signal strength threshold and signal strength in the m services, where the m services are some or all services in the N services, m is a positive integer, and m is less than or equal to N; the first signal strength is determined based on maximum signal strength in signal strength of the m services; or the first signal strength is a sum of signal strength of the m services. With this design, a more flexible manner of determining the first signal strength can be implemented.

In a possible design, the first condition includes: The first signal strength threshold is greater than or equal to the first signal strength. Therefore, whether to use the first resource as a candidate resource is flexibly determined based on first signal threshold strength and the first signal strength.

In a possible design, the terminal device may further determine the service with the highest priority from a periodic service with a highest priority and an aperiodic service with a highest priority in the N services based on the priority of the periodic service with the highest priority and the priority of the aperiodic service with the highest priority. With this design, a more proper resource determining manner can be implemented based on the periodic service with the highest priority and/or the aperiodic service with the highest priority.

In a possible design, the m services include the periodic service with the highest priority in the N services and/or the aperiodic service with the highest priority in the N services. With this design, a more proper resource determining manner can be implemented based on the periodic service with the highest priority and/or the aperiodic service with the highest priority.

In a possible design, the first condition includes: A signal strength threshold of each of the N services is greater than or equal to signal strength of the service to which the signal strength threshold belongs. With this design, whether the first resource is used as the candidate resource can be determined more accurately, interference suffered from in sidelink transmission is reduced, and transmission performance is improved.

In a possible design, the candidate resource set includes the first resource and a second resource, the second resource is reserved by a periodic service or an aperiodic service, the terminal device may determine a transmission resource based on a probability of the first resource and a probability of the second resource, the transmission resource may be used by the terminal device to perform sidelink transmission, and the probability of the first resource is less than the probability of the second resource. With this design, a probability that a resource reserved by a plurality of services is determined as the transmission resource is less than a probability that a resource reserved by only one service is selected as the transmission resource, so that interference suffered from when sidelink transmission data is sent by using the transmission resource is reduced, and transmission performance is improved.

In a possible design, the N services are sidelink transmission services.

According to a second aspect, an embodiment of this application provides a resource determining method, and the method may be performed by a terminal device that supports sidelink transmission or a component (such as a processor, a chip, or a chip system) in the terminal device.

An example in which the method is performed by the terminal device is used below for description. Based on the method, the terminal device determines that a reservation gap (gap) of a periodic service is less than or equal to a reservation upper limit W of an aperiodic service. It should be understood that resource information sent by another terminal device and received by the terminal device may indicate a resource reserved by aperiodic service data of the another terminal device, and a time domain interval between a resource reserved by the aperiodic service and a resource occupied by the resource information does not exceed W slots. The terminal device may determine, based on W resources separately reserved by the periodic service and the aperiodic service, to reduced power consumption.

In a possible design, the terminal device may receive configuration information from a network device (for example, a base station), and the configuration information may be used to indicate that the reservation gap of the periodic service is less than or equal to the reservation upper limit W of the aperiodic service.

In a possible design, the periodic service and the aperiodic service are sidelink transmission services.

According to a third aspect, an embodiment of this application provides a resource determining method, and the method may be performed by a terminal device that supports sidelink transmission or a component (such as a processor, a chip, or a chip system) in the terminal device.

An example in which the method is performed by the terminal device is used below for description. Based on the method, when the terminal device is in a discontinuous reception (discontinuous reception, DRX) mode, the terminal device determines a third resource. When the third resource is not reserved by a service outside a DRX period, the terminal device determines that a candidate resource set does not include the third resource; or when a quantity of determined candidate resources is less than a threshold or a proportion of the candidate resource to all resources in a resource pool is excessively low, the terminal device determines that a candidate resource set includes the third resource, to avoid selecting the third resource for sidelink transmission when a reservation status of the third resource cannot be accurately learned, and reduce interference suffered from in sidelink transmission.

In a possible design, the service is a sidelink transmission service.

According to a fourth aspect, an embodiment of this application provides a communication apparatus, and the communication apparatus may implement the method in the first aspect or any possible implementation of the first aspect. The apparatus includes a corresponding unit or component configured to perform the foregoing method. The unit included in the apparatus may be implemented by using software and/or hardware. The apparatus may be, for example, a terminal device, or a chip, a chip system, or a processor that can support the terminal device in implementing the foregoing method.

In a possible design, a structure of the communication apparatus may include a communication module, a processing module, and the like. These modules may perform corresponding functions of the terminal device in the first aspect or each possible design example of the first aspect.

For example, the communication apparatus may include a module configured to obtain resource information of at least N services of a plurality of second terminal devices, where the resource information may include information of a first resource, the first resource is a resource that is jointly reserved by N services, and N is greater than or equal to and include a module configured to determine signal strength thresholds of the N services based on the information of the first resource. The module configured to determine the signal strength thresholds of the N services based on the information of the first resource may be further configured to determine signal strength of the N services based on signal strength of resource information of the N received services. When the signal strength thresholds of the N services and the signal strength of the N services meet a first condition, the module configured to determine the signal strength thresholds of the N services based on the information of the first resource may be further configured to determine that a candidate resource set includes the first resource.

In a possible design, the information of the first resource includes at least one of priority information of the N services, an index of the first resource, time-frequency location information of the first resource, or type information of the N services.

Ina possible design, the information of the first resource includes the priority information of the N services, and the module configured to determine the signal strength thresholds of the N services based on the information of the first resource may be further configured to determine the signal strength thresholds of the N services based on the priority information of the N services.

Ina possible design, the module configured to determine the signal strength thresholds of the N services based on the information of the first resource may be further configured to determine a first signal strength threshold based on the signal strength thresholds of the N services. The first signal strength threshold includes a signal strength threshold of a service with a highest priority in the N services, a signal strength threshold of a service with a smallest difference between a signal strength threshold and signal strength in the N services, or a minimum signal strength threshold in signal strength thresholds of m services, where the in services are some or all services in the N services, m is a positive integer, and m is less than or equal to N.

In a possible design, the module configured to determine the signal strength thresholds of the N services based on the information of the first resource may be further configured to: determine a second signal strength threshold based on the signal strength thresholds of the N services, and determine a first signal strength threshold based on the second signal strength threshold and a value M, where the first signal strength threshold is a signal strength threshold of one of the N services. M is a constant, or M is determined based on N. The second signal strength threshold includes a signal strength threshold of a service with a highest priority in the N services, a signal strength threshold of a service with a smallest difference between a signal strength threshold and signal strength in the N services, or a minimum signal strength threshold in signal strength thresholds of m services, where the m services are some or all services in the N services, m is a positive integer, and in is less than or equal to N.

In a possible design, the first signal strength is determined based on signal strength of the service with the highest priority in the N services; the first signal strength is determined based on signal strength of a service with a minimum signal strength threshold in the N services; the first signal strength is determined based on signal strength of a service with a smallest difference between a signal strength threshold and signal strength in the m services, where the m services are some or all services in the N services, m is a positive integer, and in is less than or equal to N; the first signal strength is determined based on maximum signal strength in signal strength of the m services; or the first signal strength is a sum of signal strength of the in services.

In a possible design, the module configured to determine the signal strength thresholds of the N services based on the information of the first resource may be further configured to determine the service with the highest priority from a periodic service with a highest priority and an aperiodic service with a highest priority in the N services based on the priority of the periodic service with the highest priority and the priority of the aperiodic service with the highest priority.

In a possible design, the m services include the periodic service with the highest priority in the N services and/or the aperiodic service with the highest priority in the N services.

In a possible design, the first condition includes: The first signal strength threshold is greater than or equal to the first signal strength. Therefore, whether to use the first resource as a candidate resource is flexibly determined based on first signal threshold strength and the first signal strength.

In a possible design, the candidate resource set includes the first resource and a second resource, the second resource is reserved by a periodic service or an aperiodic service, the module configured to determine the signal strength thresholds of the N services based on the information of the first resource may be further configured to determine a transmission resource based on a probability of the first resource and a probability of the second resource, the transmission resource may be used by the terminal device to perform sidelink transmission, and the probability of the first resource is less than the probability of the second resource.

In a possible design, a structure of the communication apparatus includes a processor, and optionally, further includes a communication interface and a memory. The communication interface may be configured to send and receive information or data, and be configured to communicate and interact with another communication apparatus (such as a network device) in a network system. The processor is configured to support the communication apparatus in performing a corresponding function of the terminal device in the first aspect or each possible design example of the first aspect. The memory is coupled to the processor, and is configured to store a program instruction and data that are necessary for the first communication apparatus.

In a possible design, the N services are sidelink transmission services.

According to a fifth aspect, an embodiment of this application provides a communication apparatus, and the communication apparatus may implement the method in the second aspect or any possible implementation of the second aspect. The apparatus includes a corresponding unit or component configured to perform the foregoing method. The unit included in the apparatus may be implemented by using software and/or hardware. The apparatus may be, for example, a terminal device, or a chip, a chip system, or a processor that can support the terminal device in implementing the foregoing method.

In a possible design, a structure of the communication apparatus may include a communication module and a processing module. These modules may perform corresponding functions of the terminal device in the second aspect or each possible design example of the second aspect.

The processing module may be configured to determine that a reservation gap of a periodic service is less than or equal to a reservation upper limit W of an aperiodic service. It should be understood that resource information sent by another terminal device and received by the communication module may indicate a resource reserved by aperiodic service data of the another terminal device, and a time domain interval between a resource reserved by the aperiodic service and a resource occupied by, the resource information does not exceed W slots. The terminal device may sense the periodic service and the aperiodic service based on W to reduce power consumption caused by sensing.

Ina possible design, the communication module may be configured to receive configuration information from a network device (for example, a base station), and the configuration information may be used to indicate that the reservation gap of the periodic service is less than or equal to the reservation upper limit W of the aperiodic service.

In a possible design the periodic service and the aperiodic service are sidelink transmission services.

According to a sixth aspect, an embodiment of this application provides a communication apparatus, and the communication apparatus may implement the method in the third aspect or any possible implementation of the third aspect. The apparatus includes a corresponding unit or component configured to perform the foregoing method. The unit included in the apparatus may be implemented by using software and/or hardware. The apparatus may be, for example, a terminal device, or a chip, a chip system, or a processor that can support the terminal device in implementing the foregoing method.

In a possible design, a structure of the communication apparatus may include a communication module and a processing module. These modules may perform corresponding functions of the terminal device in the third aspect or each possible design example of the third aspect.

When the terminal device is in a discontinuous reception (discontinuous reception, DRX) mode, the processing module determines a third resource. When the third resource is not reserved by a service outside a DRX period, the processing module determines that a candidate resource set does not include the third resource: or when a quantity of determined candidate resources is less than a threshold or a proportion of the candidate resource to all resources in a resource pool is excessively low, the processing module determines that a candidate resource set includes the third resource, to avoid selecting the third resource for sidelink transmission when a reservation status of the third resource cannot be accurately learned, and reduce interference suffered from in sidelink transmission.

In a possible design, the service is a sidelink transmission service.

According to a seventh aspect, an embodiment of this application provides a communication system. The communication system may include the communication apparatus provided in the second aspect and a communication apparatus for communicating with the communication apparatus.

According to an eighth aspect, this application provides a computer storage medium, where the computer storage medium stores a program, and when the program is invoked and executed on a computer, the computer is enabled to perform the method in the first aspect or any possible design of the first aspect.

According to a ninth aspect, this application provides a computer program product, where the computing base product may include a program or instructions, and when the computer program product is run on a computer, the computer is enabled to perform the method in the first aspect or any possible design of the first aspect.

According to a tenth aspect, this application provides a chip or a chip system including the chip, and the chip may include a processor. The chip may further include a memory (or a storage module) and/or a transceiver (or a communication module). The chip may be configured to perform the method in the first aspect or any possible design of the first aspect. The chip system may include the foregoing chip, or may include the foregoing chip and another discrete component, such as the memory (or the storage module) and/or the transceiver (or the communication module).

For beneficial effects in the second aspect to the tenth aspect and the possible designs thereof, refer to descriptions of the beneficial effects of the method in the first aspect and any possible design thereof.

DESCRIPTION OF EMBODIMENTS

This application provides a resource determining method to optimize a transmission resource determining manner. The following further describes in detail this application with reference to accompanying drawings. It should be understood that a specific operation method in method embodiments described below may also be applied to an apparatus embodiment or a system embodiment.

Figure 1A:
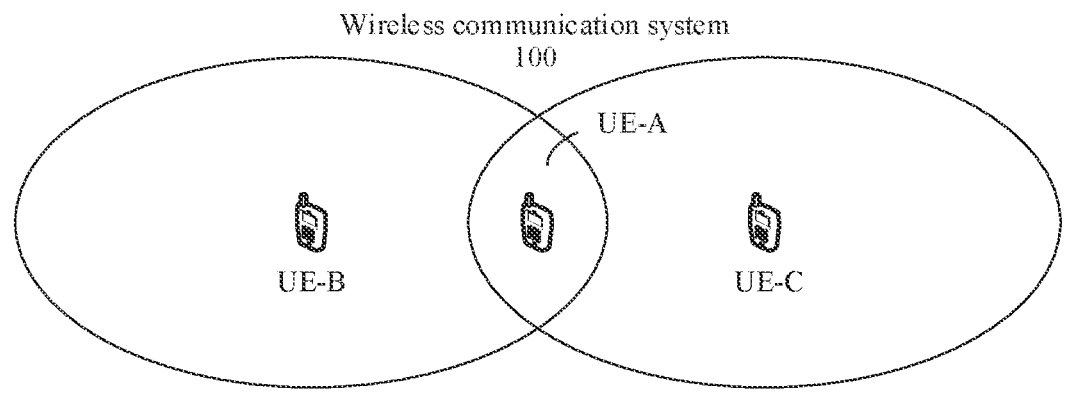
FIG. 1A is a schematic diagram of an architecture of a communication system according to an embodiment of this application.

A resource determining method provided in embodiments of this application may be applied to a wireless communication system 100 shown in FIG. 1A. It should be understood that the wireless communication system 100 may include at least one terminal device. FIG. 1A shows a possible form of the terminal device by using a mobile phone as an example. However, it should not be understood that the terminal device is limited to a mobile phone.

The terminal device may be located at a fixed position, or may be movable. It should be understood that FIG. 1A is merely a schematic diagram of an architecture of the wireless communication system. A communication system provided in this application may further include another network device not shown in FIG. 1A, for example, may further include an access network device, a radio relay device, and a radio backhaul device. A quantity of core network devices, a quantity of radio access network devices, and a quantity of terminal devices included in the mobile communication system are not limited in embodiments of this application.

The terminal device may be specifically a cellular phone; a cordless phone, a session initiation protocol (session initiation protocol, SIP) phone, a wireless local loop (wireless local loop, WLL) station, a personal digital assistant (personal digital assistant, FDA) device, a handheld device having a wireless communication function, a computing device, another processing device connected to a wireless modem, a vehicle-mounted device, a driverless vehicle, a wearable device, a terminal apparatus in a future 5G network, a terminal apparatus in a future evolved PLMN network, or the like. The terminal device may be deployed on land, including being deployed indoors or outdoors, handheld by a user, or carried by a vehicle; the terminal device may be deplored on a water surface (such as a ship); or the terminal device may be deployed in the air (for example, on an aircraft, a balloon, or a satellite).

For example, the terminal device may be a device such as a terminal (terminal), a mobile station (mobile station, MS), or a mobile terminal (mobile terminal), or an apparatus such as a chip or a chip system. The terminal device can communicate with one or more network devices in one or more communication systems, and accept a network service provided by the network device. The network device herein includes but is not limited to a third communication apparatus shown in the figure. For example, the terminal device in embodiments of this application may be a mobile phone (mobile phone), a tablet computer (pad), a computer with a wireless receiving/transmitting function, a virtual reality (virtual reality, VR) terminal device, an augmented reality (augmented reality, AR) terminal device, a wireless terminal in industrial control (industrial control), a wireless terminal in self-driving (self driving), a wireless terminal in remote medical (remote medical), a wireless terminal in a smart grid (smart grid), a wireless terminal in transportation safety (transportation safety), a wireless terminal in a smart city (smart city), a wireless terminal in a smart home (smart home), or the like; or the terminal device may be a portable, pocket-sized, handheld, computer built-in, or vehicle-mounted mobile apparatus. The terminal device may alternatively be a communication chip having a communication module.

It should be understood that the wireless communication system 100 may be applicable to both a low-frequency scenario (sub 6G) and a high-frequency scenario (above 6G). An application scenario of the wireless communication system 100 includes but is not limited to a universal mobile telecommunications system (universal mobile telecommunications system, UMTS), a long term evolution (long term evolution, LTE) system, a new radio (new radio, NR) system in a 5th generation (5th generation, 5G) mobile communication system, a future mobile communication system, and the like.

Figure 1B:
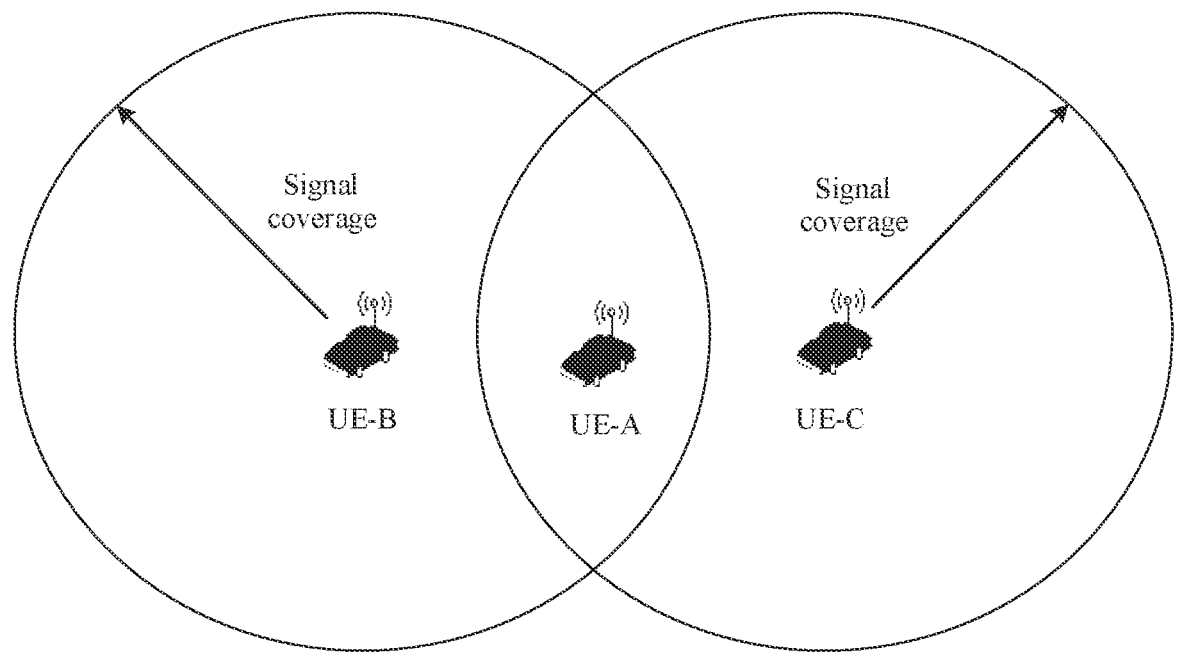
FIG. 1B is a schematic diagram of an architecture of a communication system according to an embodiment of this application.

In addition, the at least one terminal device included in the wireless communication system 100 may be a vehicle-mounted device or another internet of vehicles communication device. For example, as shown in FIG. 1B, a vehicle-mounted device UE-A may be located within coverage of UE-B and UE-C, and therefore, and therefore, the UE-A may receive data from the UE-B and the UE-C. In addition, in this application, the UE-A may be located within coverage of another UE except the UE-B and the UE-C.

It should be understood that the terminal devices shown in FIG. 1A and FIG. 1B may be configured to support communication with a network device including a base station by using a universal user to network interface (universal user to network interface, Uu air interface). The terminal device may be further configured to support sidelink transmission. For example, the UE-A shown in FIG. 1A may perform SL communication with the UE-B and/or the UE-C by using a direct communication (PC5) air interface. It should be understood that the terminal device may be a chip that has a communication module or that may be connected to a communication module, such as a chip or a module in a vehicle-mounted device, or another embedded module. For example, the terminal device is of a type such as a vehicle terminal (vehicle user/vehicle UE, VUE) and a vulnerable road user/unit (vulnerable road user/unit VRU). The VRU may include a person user/person UE (person user/person UE, PUE), a roadside unit (road side unit, RSU), an intelligent street lamp, or the like.

It should be understood that, the communication system 100 shown in FIG. 1A or FIG. 1B may be applied to service scenarios with different delay requirements and reliability requirements. For example, the communication system 100 may be applied to a scenario in which the UE-A sends a service or service data through sidelink transmission: a scenario such as an autonomous driving service, a geographic location service, or a map service with a low delay requirement and a high reliability requirement; may be applied to a voice service with a low delay requirement and a low reliability requirement; or may be applied to a service such as an online gaming service with a low reliability requirement or a data sharing service with a high reliability requirement.

This application is described below by using an example in which the VA-A shown in FIG. 1A or FIG. 1B sends service data to the UE-B, the UE-C, or another UE except the UE-B and the UE-C. The UE-A is a vehicle-mounted device of a vehicle A, or the UE-A may be an intelligent terminal such as a mobile phone of a user. This is not specifically limited.

When the UE-A needs to transmit data to another UE through sidelink transmission, the UE-A may select a transmission resource (or referred to as a resource) from a resource pool. The resource pool may be configured by a network device accessed by the UE-A. For example, the network device may be a base station (base station, BS), or include a base station and a radio resource management device or the like configured to control the base station. The base station herein may be an evolved NodeB (evolutional nodeB, eNB or eNodeB) in a UMTS/LTE system, a micro NodeB in a heterogeneous network (heterogeneous network, HetNet) scenario, or a baseband unit (base band unit; BBU) and/or a remote radio unit (remote radio unit, RRU) in a distributed base station scenario; may be a micro/pica eNodeB (micro/pico eNB) or a transmission/reception point (transmission/reception point, TRP), or may be a wireless controller in a cloud radio access network (cloud radio access network, CRAN) scenario, a baseband pool (BBU pool), and/or an RRU. Alternatively, the third communication apparatus may be a relay station, an access point, a wearable device, a base station in a future 5G network, or a base station in a future evolved MAIN network, for example, a next-generation NodeB (generated node B, gNB). This is not limited in this embodiment of this application. The third communication apparatus may alternatively be a chip that has a communication module or that may be connected to a communication module, such as a chip in the base station.

For example, the network device is a gNB. It should be understood that the UE-A shown in FIG. 1A or FIG. 1B may be located within coverage of the gNB, and the UE-B and/or the UE-C may be located within coverage of the gNB. When the UE-A transmits data to another UE through sidelink transmission, the another UE may be located within coverage of the gNB, or may be located outside coverage of the gNB.

Based on an existing resource determining method, the UE-A may select, based on the following method, a resource used for sidelink transmission.

Step 1: The UE-A receives data sent by one or more other nearby UEs (including but not limited to the UE-B and the UE-C shown in FIG. 1A or FIG. 1B), where the data may be used to determine reservation of a service of a transmission resource and/or priority information of the service.

It should be understood that, in this application, when the UE-A receives, by using a resource, service data that is being transmitted, and this may be referred to as that a service occupies the transmission resource (for example, a transmission resource B). For a periodic service, the service data also reserves a transmission resource (such as a transmission resource A, where a time domain interval between the transmission resource A and the transmission resource B is a gap) that is after the transmission resource and whose time domain interval from the transmission resource is a transmission gap (gap). Alternatively, the data from the another UE may include resource information. When the UE-A obtains the resource information, it indicates that service data is transmitted on a future transmission resource (such as a transmission resource A). In this case, this may also be referred to as that the service reserves (reservation) the transmission resource.

Step 2: The UE-A determines, based on priority information (referred to as first priority information below) of a service reserved on the transmission resource A and priority information (referred to as second priority information below) of a service that needs to be sent by the UE-A, a signal strength threshold corresponding to the transmission resource A, where there is a correspondence between the signal strength threshold, the first priority information, and the second priority information.

For example, a signal strength threshold corresponding to a transmission resource may be represented as SL-ThresRSRP_pi_pj, where pi is priority information of a service that reserves the transmission resource, and pj is the priority information of the service that needs to be sent by the UE-A.

Table 1 is a table of a correspondence between SL-ThresRSRP_pi_pj, pi, and pj. It may be considered that a larger value of pi indicates a higher priority of the service that needs to be sent by the UE-A. Similarly, a larger value of pj indicates a higher priority of the service that reserves the transmission resource. Herein, as an example for description, values of pi and pj are directly proportional to a priority of a service, but that values of pi and pj are inversely proportional to a priority of a service is not excluded. For example, a larger value of pi indicates a lower priority of the service that needs to be sent by the UE-A. Similarly, a larger value of pj indicates a lower priority of the service that reserves the transmission resource.

TABLE 1

| SL-ThresRSRP_pi_pj (/dBm) | pi | pj |
|---|---|---|
| Threshold 1 | 1 | 1 |
| Threshold 2 | 1 | 2 |
| Threshold 3 | 2 | 1 |

In Table 1, if pi remains unchanged, a larger value of pj indicates a smaller value of SL-ThresRSRP_pi_pj corresponding to pi and pj. For example, in Table 1, values of pi corresponding to the threshold 1 and the threshold 2 are 1, but a value of pj corresponding to the threshold 1 is less than a value of pj corresponding to the threshold 2, and in this case, a value of the threshold 1 is greater than a value of the threshold 2, for example, the value of the threshold 1 is 15 decibel-milliwatts (dBm), and the value of the threshold 2 is 10 dBm. If pj remains unchanged, a larger value of pi indicates a larger value of corresponding SL-ThresRSRP_pi_pj. For example, in Table 1, values of pj corresponding to the threshold 1 and the threshold 3 are 1, but a value of pi corresponding to the threshold 3 is greater than the value of pi corresponding to the threshold 1, and in this case, a value of the threshold 3 is greater than the value of the threshold 1, for example, the value of the threshold 1 is 15 dBm, and the value of the threshold 3 is 20 dBm.

It should be understood that the correspondence table shown in Table 1 may be pre-stored in the UE-A, or may be sent by the network device such as the base station to the UE-A. In addition, for different transmission resources, the correspondence between SL-ThresRSRP_pi_pj, pi. and pj may be the same, for example, as shown in Table 1.

Similarly, the L1E-A may further determine, in the foregoing manner, SE-ThresRSRP_pi_pj corresponding to another transmission resource.

Step 3: The UE-A may determine, based on signal strength of a received signal on the transmission resource A and the signal strength threshold corresponding to the transmission resource A. whether to use the transmission resource A as a candidate resource. The signal strength of the received signal on the transmission resource A may be obtained by the UE-A by sensing the transmission resource A. Greater signal strength indicates stronger interference suffered from when the UE-A performs sidelink transmission on the transmission resource A.

For example, the UE-A may sense the transmission resource A to obtain reference signal received power (reference signal receiving power, RSRP), and the RSRP is the signal strength of the received signal on the transmission resource A. Then, the UE-A may compare a value of the RSRP with a value of the signal strength threshold corresponding to the transmission resource A. For example, if the UE-A determines, based on pi and pj, that the signal strength threshold corresponding to the transmission resource A is the threshold 1 shown in Table 1, the UE-A may compare the RSRP with the threshold A. If the RSRP is not greater than (or less than) the threshold 1, the UE-A determines that the transmission resource A is a candidate resource. If the RSRP is not less than (or greater than) the threshold 1, the UE-A determines that the transmission resource A is not a candidate resource.

Similarly, the UE-A may further determine, in the foregoing manner, whether another transmission resource is a candidate resource.

Step 4: When the UE-A determines at least one candidate resource (a set of the at least one candidate resource may be referred to as a candidate resource set), the UE-A may determine, from the at least one candidate resource based on factors such as signal strength of the candidate resource, a transmission resource used to send service data, and the transmission resource may be used by the UE-A to send the service data, for example, used by the UE-A to send the service data to another UE through SL communication. UE that receives the service data sent by the UE-A may be different from any UE that sends the resource information, or may be one or more UEs that send the resource information, for example, includes but is not limited to the UE-B and the UE-C shown in FIG. 1A or FIG. 1B.

For example, the UE-A may select, based on a value of RSRP of the candidate resource, a candidate resource with minimum RSRP to send the service data. to reduce transmission interference suffered from in a process of sending the service data.

In the foregoing resource determining manner, if the UE-A finds that a specific transmission resource is reserved by a plurality of services, and priorities of the plurality of services are different, it is difficult for the UE-A to determine SL-ThresRSRP_pi_pj of the transmission resource based on the correspondence shown in Table 1, because there are a plurality of values of pi, and the UE-A probably cannot properly determine SL-ThresRSRP_pi_pj, and therefore cannot accurately determine whether the transmission resource is a candidate resource. In addition, if the transmission resource is reserved by a plurality of services, even if priorities of the plurality of services are the same, that is, the plurality of services have same SL-ThresRSRP_pi_pj, it is very likely that RSRP of each piece of service data sensed by the UE-A is different. Therefore, the UE-A probably cannot properly select one RSRP to compare a value of the RSRP with a value of SL-ThresRSRP_pi_pj, and still cannot properly determine whether the transmission resource is a candidate resource. Therefore, an existing resource determining manner in SL communication needs to be optimized.

Figure 2:
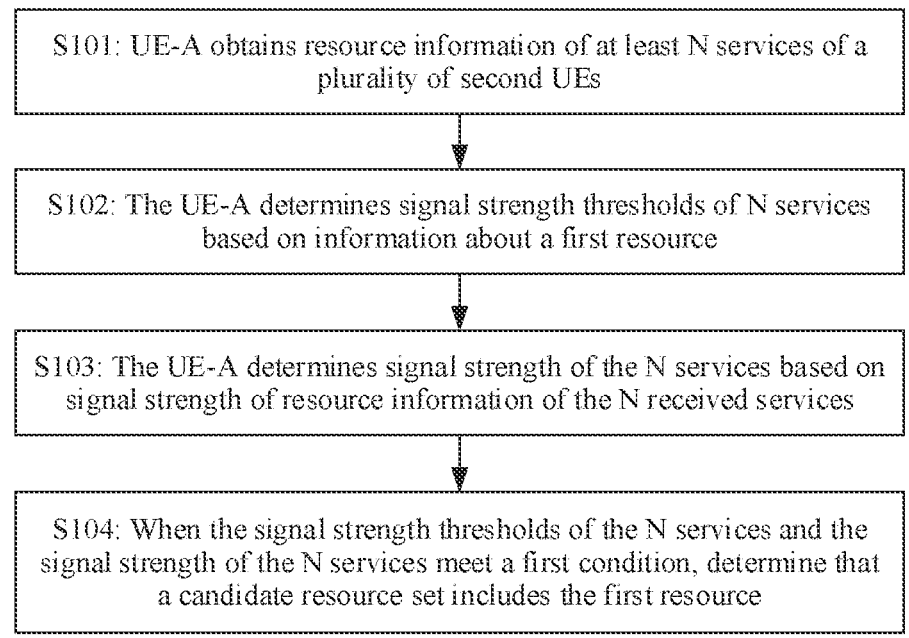
FIG. 2 is a schematic flowchart of a resource determining method according to an embodiment of this application.

A resource determining method provided in an embodiment of this application may be applied to the communication system shown in FIG. 1A or FIG. 1B, to improve rationality of resource determining when the UE-A sends sidelink transmission data and improve transmission performance. For example, the method may include the following steps shown in FIG. 2.

S101: The UE-A obtains resource information of at least N services of a plurality of second UEs.

The resource information may include information of a first resource, the first resource is a resource that is jointly reserved by N services, and N is greater than or equal to 2. The first resource is a resource reserved by a plurality of UEs. Therefore, the plurality of second UEs may send data of a corresponding service or receive data of a corresponding service by using the first resource.

It should be understood that the service herein may be a sidelink transmission service performed by the second UE. Specifically, the sidelink transmission service may include a periodic service or an aperiodic service. The plurality of second UEs may include the UE-B and the UE-C shown in FIG. 1A or FIG. 1B, or at least one of other UEs not shown in FIG. 1A and FIG. 1B.

In a possible implementation, the resource information may include a correspondence between services from the plurality of second UEs and information of a resource reserved by the services. The UE-A may receive the foregoing correspondence from the second UE through sensing.

The information of the resource reserved by the service may include at least one of priority information of the service that reserves the resource, an index of the resource, time-frequency location information of the resource, or service type information of the service. The priority information of the service that reserves the resource may be used by the UE-A to determine a signal strength threshold of the service. After determining the resource as a candidate resource, the UE-A may perform sidelink transmission by using the resource based on the index of the resource and the time-frequency location information of the resource. The service type information of the service may be used to determine a type of the service. For example, the type information may indicate that the service is a service of a service type such as an autonomous driving service, a geographic location service, a map service, or a voice service. Therefore, the UE-A may determine, based on the service type, whether the service is a periodic service or an aperiodic service. In addition, the information of the resource reserved by the service may further include a communication identifier of the second UE, and the communication identifier is used to identify second UE to which the service belongs and second UE that sends the resource information of the service.

After receiving resource information from the plurality of second UEs, the UE-A may obtain a table of a correspondence between a service, priority information of the service, and information of a resource reserved by the service, to determine whether a transmission resource in the correspondence table is used as a candidate resource.

For example, resource information of a plurality of services that is received by the UE-A from the UE-B is shown in Table 2. A service 1, a service 3, and a service 5 of the UE-B respectively reserve a resource A, a resource B, and a resource C. It should be understood that, in Table 2, as an example for description, information of a resource reserved by a service includes priority information of the service and an index of a transmission resource, and the resource information is not limited to the priority information and the index of the transmission resource in Table 2.

TABLE 2

| Service | Priority information of the service | Resource index |
|---|---|---|
| Service 1 | 1 | Resource A |
| Service 3 | 2 | Resource B |
| Service 5 | 3 | Resource C |
| ... | ... | ... |

In addition, resource information of a plurality of services that is received by the UE-A from the UE-C is shown in Table 3. A service 2, a service 4, and a service 6 of the UE-C respectively reserve a resource A, a resource B, and a resource C.

TABLE 3

| Service | Priority information of the service | Resource index |
|---|---|---|
| Service 2 | 2 | Resource A |
| Service 4 | 3 | Resource B |
| Service 6 | 3 | Resource C |
| ... | ... | ... |

After receiving the resource information shown in Table 2 and Table 3, the UE-A may determine a correspondence, shown in Table 4, between information of a resource reserved by a plurality of services and the services, and may identify, based on the correspondence shown in Table 4, the first resource reserved by the N services. Compared with Table 2 and Table 3, information of each resource in Table 4 corresponds to a plurality of services.

TABLE 4

| Resource index | Service |
|---|---|
| Resource A | Service 1, service 2 |
| Resource B | Service 3, service 4 |
| Resource C | Service 5, service 6 |
| . . . | . . . |

In Table 4, as an example for description; information of a resource is an index of the resource. Based on Table 4, the UE-A may determine that the resource A, the resource B, and the resource C each are reserved by a plurality of services. Therefore, it may be determined that the first resource includes the resource A, the resource B, and the resource C. The UE-A may separately identify, based on the method provided in this application, whether the resource A, the resource B, and the resource C are used as candidate resources. The information of the first resource may include priority information of the N services that reserve the first resource, an index of the first resource, time-frequency location information of the first resource, or service type information of the N services. In addition, the information of the first resource may further include the communication identifier of the second UE, and the communication identifier is used to identify second UE to which the service that reserves the first resource belongs and second UE that sends the resource information of the service.

For example, the first resource is the resource A. The information of the first resource may include priority information of the service 1, priority information of the service 2, and service type information, and include an index of the resource A and time-frequency location information of the resource A.

It should be understood that, in Table 4, an index of a resource is used as an example to describe a correspondence between information of the resource and a service. The information of the resource may further include at least one of priority information of the service that reserves the resource, an index of the resource, time-frequency location information of the resource, or service type information of the service.

S102: The UE-A determines, based on information of the resource information, signal strength thresholds of the N services that reserve the first resource.

For example, the signal strength threshold of the service that reserves the first resource may be determined based on a priority pi of a service that needs to be sent by the UE-A, a priority pi of the service, and a correspondence between pi, pj, and a signal strength threshold SL-ThresRSRP_pi_pj. The priority of the service may be carried in the information of the first resource, the priority of the service that needs to be sent by the UE-A is determined by the UE-A based on the service, and the correspondence between pi, pj, and the signal strength threshold SE-ThresRSRP_pi_pj is shown in Table 1.

Specifically, if the N services include the service 1, a priority of the service 1 is 1 (that is, pj=1), and a priority of an SL service to be performed by the UE-A is 1 (that is, pi=1), the UE-A may determine, based on Table 1, that a signal strength threshold of the service 1 is the threshold 1.

S103: The UE-A determines signal strength of the N services based on signal strength of resource information of the N received services.

For example, if the N services include the service 1 and the service 2, where the service 1 is a service of the UE-B, and the service 2 is a service of the UE-C, RSRP obtained when the UE receives resource information including the service 1 from the UE-B is RSRP 1, and RSRP obtained when the UE receives resource information including the service 2 from the UE-B is RSRP 2, the UE-A may use the RSRP 1 as signal strength of the service 1, or perform processing on the RSRP 1 based on an existing method to obtain signal strength of the service 1, and may use the RSRP 2 as signal strength of the service 2, or perform processing on the RSRP 2 based on the existing method to obtain signal strength of the service 2.

For example, based on steps S102 and S103, the LE-A may determine a signal strength threshold and signal strength of each service for the N services that reserve the first resource. The signal strength threshold of the service that reserves the first resource may be determined based on the priority pj of the service that needs to be sent by the UE-A, the priority pi of the service, and the correspondence between pi, pj, and the signal strength threshold SL-ThresRSRP_pi_pj. Specifically, for example, the correspondence between pi, pj, and the signal strength threshold SE-ThresRSRP_pi_pj is shown in Table 1. The signal strength of the service that reserves the first resource may be determined by the UE-A based on the signal strength of the resource information of the N received services.

For example, as shown in Table 5, the UE-A may store, based on S102 and S103, a correspondence between the signal strength thresholds and the signal strength of the N services that reserve the first resource.

TABLE 5

| Service | Priority information of the service | Signal strength |
|---|---|---|
| Service A | Threshold_A | RSRP_A |
| Service B | Threshold_B | RSRP_B |
| Service C | Threshold_C | RSRP_C |
| Service D | Threshold_D | RSRP_D |

Alternatively, as shown in Table 6, the UE-A may store a correspondence between service types, the signal strength thresholds, and the signal strength of the N services that reserve the first resource.

TABLE 6

| Service | Service type | Priority information of the service | Signal strength |
|---|---|---|---|
| Service A | Periodic service | Threshold_A | RSRP_A |
| Service B | Aperiodic service | Threshold_B | RSRP_B |
| Service C | Aperiodic service | Threshold_C | RSRP_C |
| Service D | Periodic service | Threshold_D | RSRP_D |

S104: When the signal strength thresholds of the N services of the first resource and the signal strength of the N services meet a first condition, the UE-A determines that a candidate resource set includes the first resource.

By using the foregoing procedure, when a plurality of services reserve the first resource, the UE-A may comprehensively consider the signal strength thresholds and the signal strength of the N services that reserve the first resource, properly determine whether the first resource is used as a candidate resource, and further determine a transmission resource based on the candidate resource to reduce interference suffered from when service data is sent by using the transmission resource, so that transmission performance can be improved.

It should be understood that, in this embodiment of this application, the N services that reserve the first resource may include the periodic service and/or the aperiodic service. The periodic service means that SL service data is transmitted based on a fixed period. Therefore, the UE-A can determine, based on a resource reserved by a periodic service and sensed in a previous period range, a resource reserved by the service in a next period range. Therefore, when sending the service data in the next period range, the UE-A can properly select a resource based on a resource reservation status of the periodic service, to reduce interference caused by another piece of service data to the service data sent by the UE-A. The aperiodic service means that the SL service data is not sent in a fixed sending period. Therefore, the UE-A cannot properly select, based on a resource reserved by data of the aperiodic service in a previous period, a resource used in a next period by the UE-A to send a service. For the aperiodic service, the UE-A needs to learn, based on resource information of UE that sends data of the aperiodic service, time at which the data of the aperiodic service is sent, that is, learn a time domain location of a resource occupied by the aperiodic service.

For example, the UE-A may identify, based on a control signal for scheduling the service data, whether the service is a periodic service. Specifically, the control signal may carry indication information (for example, a length is one bit (bit)). The indication information may indicate that the service is a periodic service, or may indicate that the service is an aperiodic service. The indication information may be SL control information (sidelink control information, SCI).

Figure 3A:
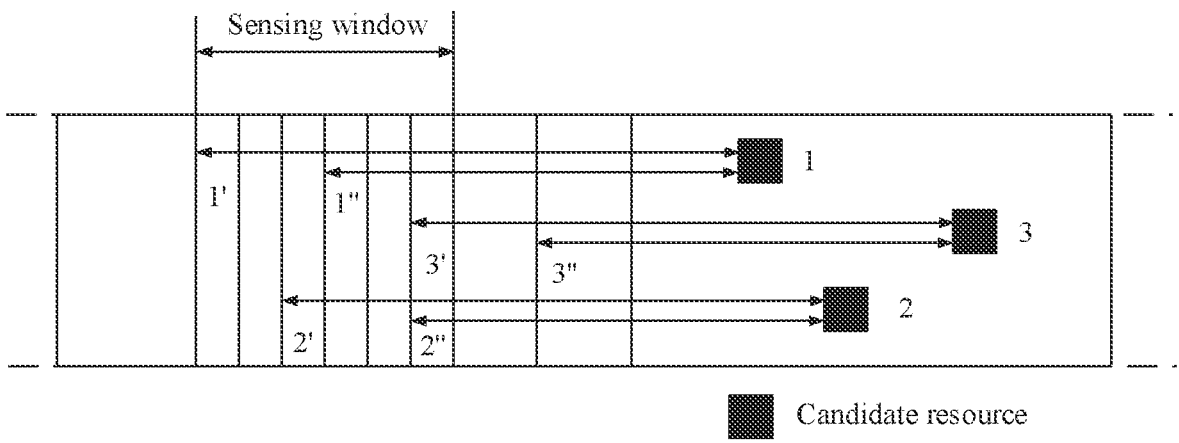
FIG. 3A is a schematic diagram of a sensing window according to an embodiment of this application.

As shown in FIG. 3A, the UE-A may sense, in a sensing window, a resource reserved by service data sent by another UE.

Specifically, for the periodic service, the UE-A may receive resource information from the another UE. The resource information may be carried in a periodic service sent by the another UE, and is used to indicate information such as a gap (gap) for sending the service data. In this case, the UE-A may learn that service data in a next period is to be sent on a resource on a resource gap for receiving the resource information.

For example, as shown in FIG. 3A, the UE-A receives data of a service 1 on a resource 1' in the sensing window, and learns that the service 1 is a periodic service; and in this case, the UE-A may learn that the service 1 reserves a resource 1 shown in FIG. 3A, and an interval between the resource 1 and the resource 1' is a gap. Similarly, the UE-A receives data of a service 2 on a resource 2' in the sensing window, and learns that the service 2 is a periodic service; and in this case, the LE-A may learn that the service 2 reserves a resource 2 shown in FIG. 3A, and an interval between the resource 2 and the resource 2' is the gap. The UE-A receives data of a service 3 on a resource 3' in the sensing window, and learns that the service 3 is a periodic service; and in this case, the UE-A may learn that the service 3 reserves a resource 3 shown in FIG. 3A, and an interval between the resource 3 and the resource 3' is the gap.

For the aperiodic resource, the UE-A may receive resource information sent by the another UE, to learn a resource reserved by the aperiodic service. The resource information is received by the UE-A in the sensing window, and a time domain interval between a resource reserved by the aperiodic service and indicated by the resource information and a resource occupied by the resource information does not exceed W slots (slot), for example, W is 32 slots.

For example, as shown in FIG. 3A, if the UE-A receives resource information of an aperiodic service 4 on a resource 1" in the sensing window, to indicate that data of the service 4 is to be sent on the resource 1, the UE-A may learn that the service 4 reserves the resource 1 shown in FIG. 3A, and an interval between the resource 1 and the resource 1" does not exceed the W slots. Similarly, if the UE-A receives resource information of a service 5 on a resource 2" in the sensing window, to indicate that data of the service 5 is to be sent on the resource 2, the UE-A may learn that the service 5 reserves the resource 2 shown in FIG. 3A, and an interval between the resource 2 and the resource 2" does not exceed the W slots. In addition, resource information of a service 6 is sent on a resource 3" shown in FIG. 3A. Because the resource 3" does not belong to the sensing window of the UE-A, the UE-A cannot receive the resource information, and in this case, the UE-A cannot learn that data of the service 6 is to be sent on the resource 3.

It should be understood that ii values of the gap and W are different, the UE-A needs to separately set two sensing windows for the gap and W and the UE-A separately performs sensing in the two sensing windows, to sense resources reserved by all services, and ensure no omissions.

For example, in a scenario in which there are two service types: the periodic service and the aperiodic service, the base station may configure, by using signaling, gaps of periodic services of all UEs to be less than or equal to W or it may be defined in a protocol that a gap of periodic services of UE is less than or equal to W. W is set to, for example, 32 slots. In this setting, the UE-A does not need to separately set the sensing window for the periodic service and the aperiodic service, and only needs to set the sensing window based on W to meet sensing requirements for the periodic service and the aperiodic service, to reduce a quantity of sensing times and reduce sensing power consumption.

Figure 3B:
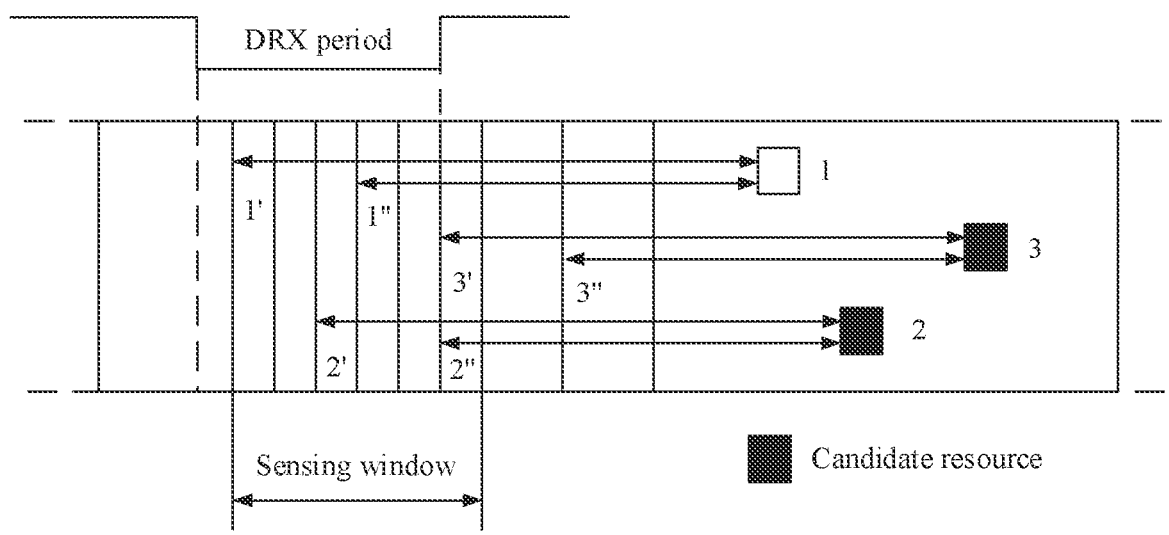
FIG. 3B is a schematic diagram of another sensing window according to an embodiment of this application.

In addition, as shown in FIG. 3B, in a discontinuous reception (discontinuous reception. DRX) mode, the UE-A does not receive data in a DRX period, and therefore, cannot determine a periodic service and an aperiodic service that reserve a resource 1 shown in FIG. 3B, and cannot sense a periodic service that reserves a resource 2. In this case, the UE-A cannot learn that a service reserves the resource 1. However, because a sensing result of the resource 1 when the UE-A is in the DRX period is undetermined, the UE-A does not use the resource 1 as a candidate resource.

The UE-A may use the resource 1 as a candidate resource only in a special case, for example, when a proportion of a candidate resource to all resources in a resource pool is excessively low or there are not enough candidate resources (for example, a quantity of candidate resources is less than or equal to a threshold).

A possible implementation of S104 is specifically described below

In a possible implementation of S104, the UE-A may determine a first signal strength threshold based on the signal strength thresholds of the N services, and determine first signal strength based on the signal strength of the N services, and when the first signal strength threshold is greater than or equal to the first signal strength, the UE-A determines that the first condition is met, that is, determines the first resource as a resource in a candidate resource set. Alternatively, the first condition includes: The first signal strength threshold is greater than or equal to the first signal strength.

On the contrary, if the first signal strength threshold is less than the first signal strength, the first condition is not met, and the UE-A determines that the first resource is not used as a resource in the candidate resource set.

A manner in which the UE-A determines the first signal strength threshold based on the signal strength thresholds of the N services is described below as an example with reference to the correspondence table shown in Table 5 or Table 6.

When the first signal strength threshold is determined, in a possible implementation, the UE-A may use a signal strength threshold of a service with a highest priority in the N services as the first signal strength threshold.

For example, the service with the highest priority may be a periodic service with a highest priority in the N services sensed by the UE-A that reserve the first resource, or an aperiodic service with a highest priority in the N services. Specifically, the UE-A may determine the periodic service with the highest priority from periodic services in the N services, and determine the aperiodic service with the highest priority from aperiodic services in the N services, and then the UE-A may use a service with a highest priority in the periodic service with the highest priority and the aperiodic service with the highest priority as the service with the highest priority. For example, the N services include the service A, the service B, and the service C shown in Table 5 or Table 6. If the service A is a periodic service with a highest priority, the service B is an aperiodic service with a highest priority, and the priority of the service A is higher than the priority of the service B. that is, the service A is the service with the highest priority, the UE-A may use Threshold_A corresponding to the service A as the first signal strength threshold.

In another manner of determining the first signal strength threshold, the UE-A may use a signal strength threshold of a service with a smallest difference between a signal strength threshold and signal strength in the N services as the first signal strength threshold. For example, based on Table 5 or Table 6, if Threshold_A-RSRP_A=a, Threshold_B-RSRP_B=b, and Threshold_C-RSRP_C=c, where a>b>c, that is, the service C is a service with a smallest difference between a signal strength threshold and signal strength, the UE-A may use Threshold C corresponding to the service C as the first signal strength threshold.

In another manner of determining the first signal strength threshold, the UE-A may use a minimum signal strength threshold in signal strength thresholds of in services as the first signal strength threshold, and the in services are some or all services in the N services that reserve the first resource. For example, in Table 5 or Table 6, if Threshold_A>Threshold_B>Threshold_C, that is, Threshold_C is the minimum signal strength threshold in the signal strength thresholds of the m services, the UE-A may use Threshold_C as the first signal strength threshold.

For example, the m services include the periodic service with the highest priority and/or the aperiodic service with the highest priority in the N services. For example, the in services include m services with a highest priority in the N services.

During determining of the first signal strength threshold, in another possible implementation, the UE-A may use, as a second signal strength threshold, a signal strength threshold of the service with the highest priority in the N services, a signal strength threshold of the service with a smallest difference between a signal strength threshold and signal strength, or a minimum signal strength threshold in signal strength thresholds of the in services, and determine the first signal strength threshold based on the second signal strength threshold and a value M. M is a constant, such as 5 dB. Alternatively, M corresponds to N. A correspondence between M and N may be shown in Table 7; or M and N are in a function relationship, for example, M=0*log 10(N)

TABLE 7

| N | M |
|---|---|
| 2 ≤ N ≤ 3 | 3 dB |
| 4 ≤ N ≤ 7 | 6 dB |
| 8 ≤ N | 9 dB |

For example, a value of the first signal strength threshold is a difference between a value of the second signal strength threshold and M.

For example, the N services include the service A, the service B, and the service C shown in Table 5 or Table 6, where the service A is a service with a highest priority, and the UE-A may use (Threshold_A-M) as the first signal strength threshold.

For another example, if the service C shown in Table 5 or Table 6 is a service with a smallest difference between a signal strength threshold and signal strength, the UE-A may use (Threshold_C-M) as the first signal strength threshold.

For another example, if the service C shown in Table 5 or Table 6 is a service with a minimum signal strength threshold, the UE-A may use (Threshold_C-M) as the first signal strength threshold.

During determining of the first signal strength, in a possible example, the first signal strength may be determined based on signal strength of the service with the highest priority in the N services. For example, if the service A shown in Table 5 or Table 6 is the service with the highest priority, the UE-A may use RSRP_A as the first signal strength, or determine the first signal strength based on RSRP_A and the value M, for example, a first signal is determined as a sum of RSRP_A and the value where M is a constant, such as 5 dB, or M corresponds to N. A correspondence between M and N may be shown in Table 7; or M and N are in a function relationship, fir example, M=10*log 10(N) (dB).

In another manner of determining the first signal strength, the first signal strength may be determined based on signal strength of a service with a minimum signal strength threshold in the m services, where the in services are some or all services in the N services. For example, if the service C shown in Table 5 or Table 6 is the service with the minimum signal strength threshold, the UE-A may use RSRP_C as the first signal strength. Alternatively, for a specific method in which the UE-A may determine the first signal strength based on RSRP_C and the value M, refer to the foregoing descriptions of determining the first signal strength based on RSRP_A and the value M.

In another manner of determining the first signal strength, the first signal strength may be determined based on signal strength of the service with the smallest difference between a signal strength threshold and signal strength in the N services. For example, if the service C shown in Table 5 or Table 6 is the service with the smallest difference between a signal strength threshold and signal strength, the UE-A may use RSRP_C as the first signal strength. Alternatively, for a specific method in which the UE-A may determine the first signal strength based on RSRP_C and the value M, refer to the foregoing descriptions of determining the first signal strength based on RSRP_A and the value M.

In another manner of determining the first signal strength, the first signal strength may be determined based on maximum signal strength in signal strength of the m services, where the m services are some or all services in the N services. For example, if the service B shown in Table 5 or Table 6 is a service with maximum signal strength, the UE-A may use RSRP_B as the first signal strength. Alternatively, for a specific method in which the UE-A may determine the first signal strength based on RSRP_B and the value M, refer to the foregoing descriptions of determining the first signal strength based on RSRP_A and the value M.

After the first signal strength threshold and the first signal strength are determined in any one of the foregoing manners, the UE-A may compare a value of the first signal strength threshold and a value of the first signal strength, and determine, based on a comparison result, whether the first condition is met. If the first condition is met, the UE-A may perform S103; or if the first condition is not met, the UE-A may perform S104, to determine whether the candidate resource set includes the first resource.

Figure 4:
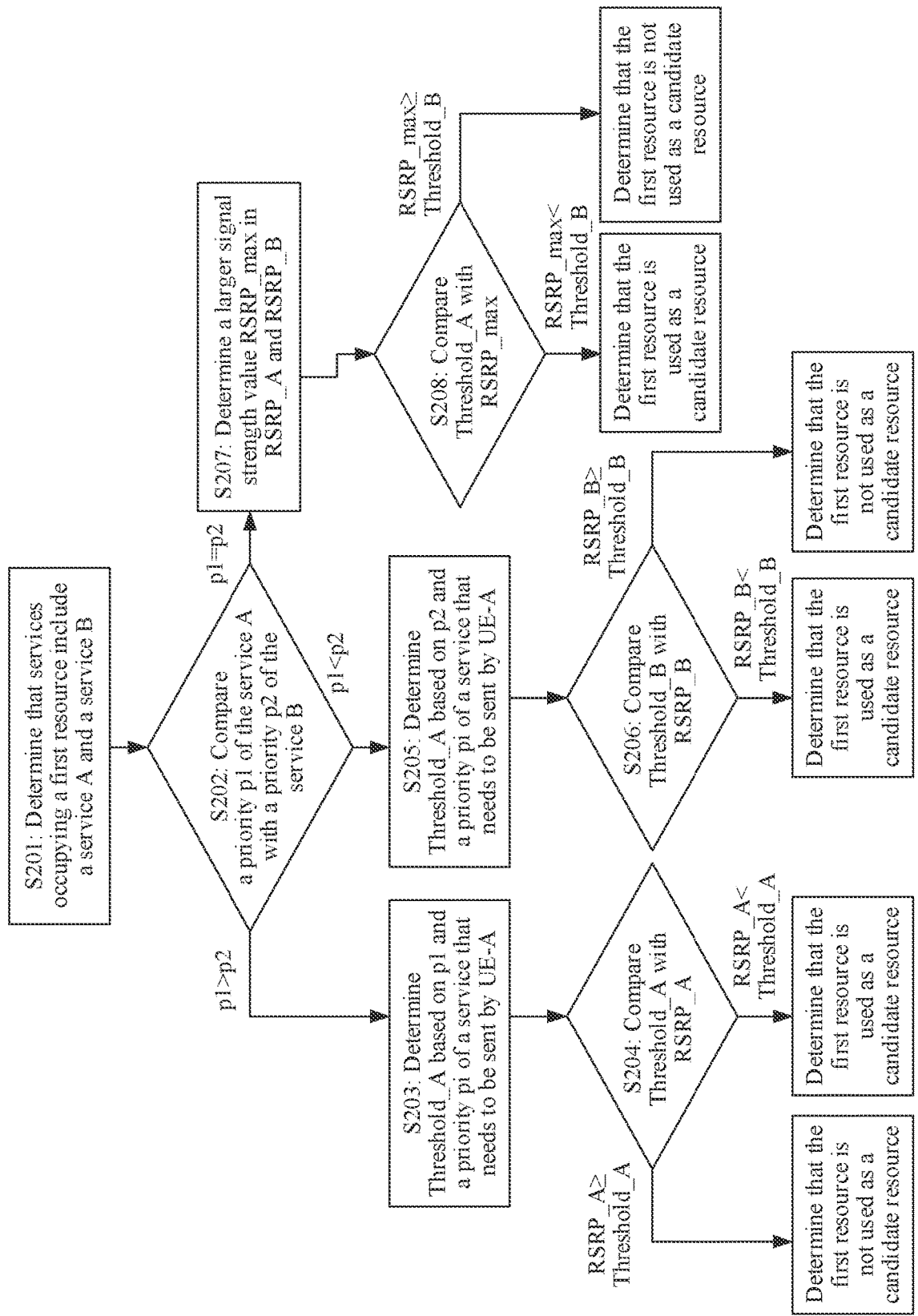
FIG. 4 is a schematic flowchart of a resource determining method according to an embodiment of this application.

In a specific example, if the UE-A determines, based on the signal strength threshold and the signal strength of the service with the highest priority in the N services that reserve the first resource, whether the first resource is used as a candidate resource, the resource determining method provided in this embodiment of this application may include the following steps shown in FIG. 4.

S201: The UE-A determines that the services that reserve the first resource include the service A and the service B shown in Table 5 or Table 6.

S202: The UE-A compares a priority p1 of the service A with a priority p2 of the service B.

If the priority p1 of the service A is higher than (or not lower than) the priority p2 of the service B, S203 and S204 are performed. If p2 is higher than (or not lower than) p1, S205 and S206 are performed. If the priority p1 is the same as p2, S207 and S208 are performed.

S203: The UE-A determines Threshold_A based on p1 and a priority pj of a service that needs to be sent by the UE-A.

Threshold_A corresponds to pj and p1, and pj is the priority of the service that needs to be sent by the UE-A.

S204: The UE-A compares a value of Threshold_A with a value of RSRP_A.

RSRP_A is signal strength of a received signal of the service A sensed by the UE-A.

If RSRP_A is greater than (or not less than) Threshold_A, the UE-A determines that the first resource is not used as a candidate resource. Otherwise, if RSRP_A is less than (or not greater than) Threshold_A, the UE-A determines that the first resource is used as a candidate resource.

S205: The UE-A determines Threshold_B based on p2 and a priority pj of a service that needs to be sent by the UE-A.

Threshold_B corresponds to pj and p2, and pj is the priority of the service that needs to be sent by the UE-A.

S206: The UE-A compares a value of Threshold_B with a value of RSRP_B.

If RSRP_B is greater than (or not less than) Threshold_B, the UE-A determines that the first resource is not used as a candidate resource; or otherwise, if RSRP_B is less than (or not greater than) Threshold_B, the UE-A determines that the first resource is used as a candidate resource.

S207: The UE-A determines a larger signal strength value (denoted as RSRP_max) in RSRP_A and RSRP_B.

S208: The UE-A compares a value of RSRP max with a value of Threshold_A (or Threshold_B). If RSRP_max is greater than (or not less than) Threshold_A, the UE-A determines that the first resource is not used as a candidate resource. Otherwise, if RSRP_max is less than (or not greater than) Threshold_A, the UE-A determines that the first resource is used as a candidate resource.

In the foregoing example, if the service that reserves the first resource further includes the service C, for example, the service B and the service C are aperiodic services, before performing S202, the UE-A may further compare the priority of the service B with a priority of the service C, and then perform S202 when the priority of the service B is higher than (or not lower than) the priority of the service C.

Figure 5:
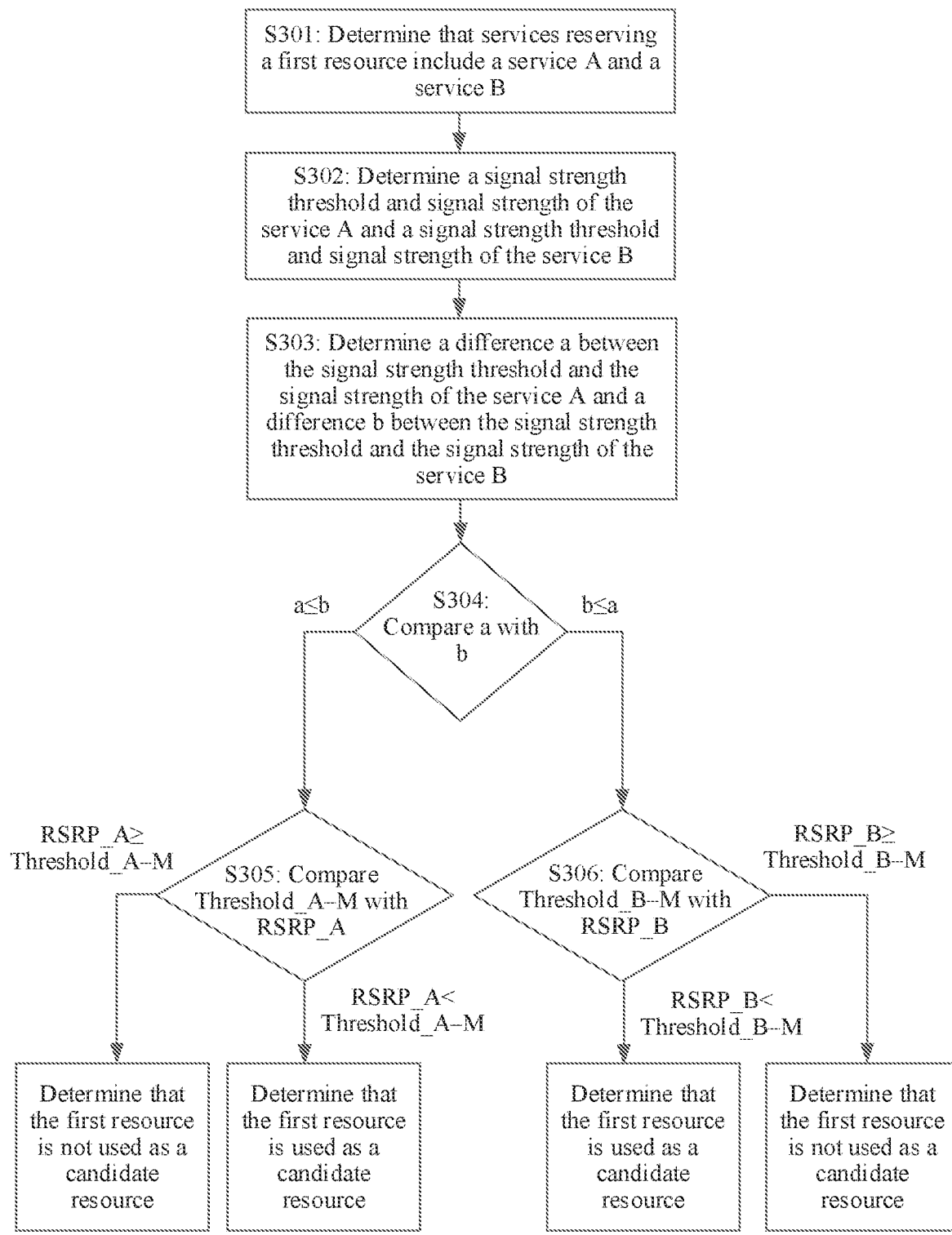
FIG. 5 is a schematic flowchart of a resource determining method according to an embodiment of this application.

If the UE-A determines, based on the signal strength threshold and the signal strength that are of the service with the smallest difference between a signal strength threshold and signal strength in the N services that reserve the first resource, whether the first resource is used as a candidate resource, the resource determining method provided in this embodiment of this application may include the following steps shown in FIG. 5.

S301: The UE-A determines that the services that reserve the first resource include the service A and the service B shown in Table 5 or Table 6.

The UE-A may determine, based on resource information from at least one UE, the first correspondence shown in Table 5 or Table 6. For example, the UE-A may receive resource information from the UE-B, and determine, based on the resource information, that the service A of the UE-B reserves the first resource. In addition, the UE-A may receive resource information from the UE-C, and determine, based on the resource information, that the service A of the UE-C reserves the first resource. Alternatively, the UE-A may receive resource information from the UE-B, and learn, based on the resource information, that the service A and the service B reserve the first resource. In this case, both the service A and the service B may be services of the UE-B, or are separately services of different UEs. This is not specifically limited herein.

S302: The UE-A determines a signal strength threshold and signal strength of the service A and a signal strength threshold and signal strength of the service B.

The signal strength threshold of the service A is Threshold_A, the signal strength of the service A is RSRP_A, the signal strength threshold of the service B is Threshold_B, and the signal strength of the service B is RSRP_B.

S303: The UE-A determines a difference a between the signal strength threshold and the signal strength of the service A and a difference b between the signal strength threshold and the signal strength of the service B, where a=Threshold_A-RSRP_A, and b=Threshold_B-RSRP_B.

S304: The UE-A compares the difference a between the signal strength threshold and the signal strength of the service A with the difference b between the signal strength threshold and the signal strength of the service B.

If a is less than b, S305 is performed. If b is less than a, S306 is performed. If a is equal to b, either of S305 and S306 is performed.

S305: The UE-A compares a value of (Threshold_A-M) with a value of RSRP_A.

M is a positive integer. M is a constant, or M corresponds to N, for example, M=10*log 10(N).

If RSRP_A is greater than (or not less than) (Threshold_A-M), the UE-A determines that the first resource is not used as a candidate resource. Otherwise, if RSRP_A is less than (or not greater than) (Threshold_A-M), the UE-A determines that the first resource is used as a candidate resource.

S306: The UE-A compares a value of (Threshold_B-M) with a value of RSRP_B.

M is a positive integer. M is a constant, or M corresponds to N, for example, M=10*log 10(N).

If RSRP_B is greater than (Threshold_B-M), the UE-A determines that the first resource is not used as a candidate resource; or otherwise, if RSRP_B is less than (or not greater than) (Threshold_B-M), the UE-A determines that the first resource is used as a candidate resource.

Figure 6:
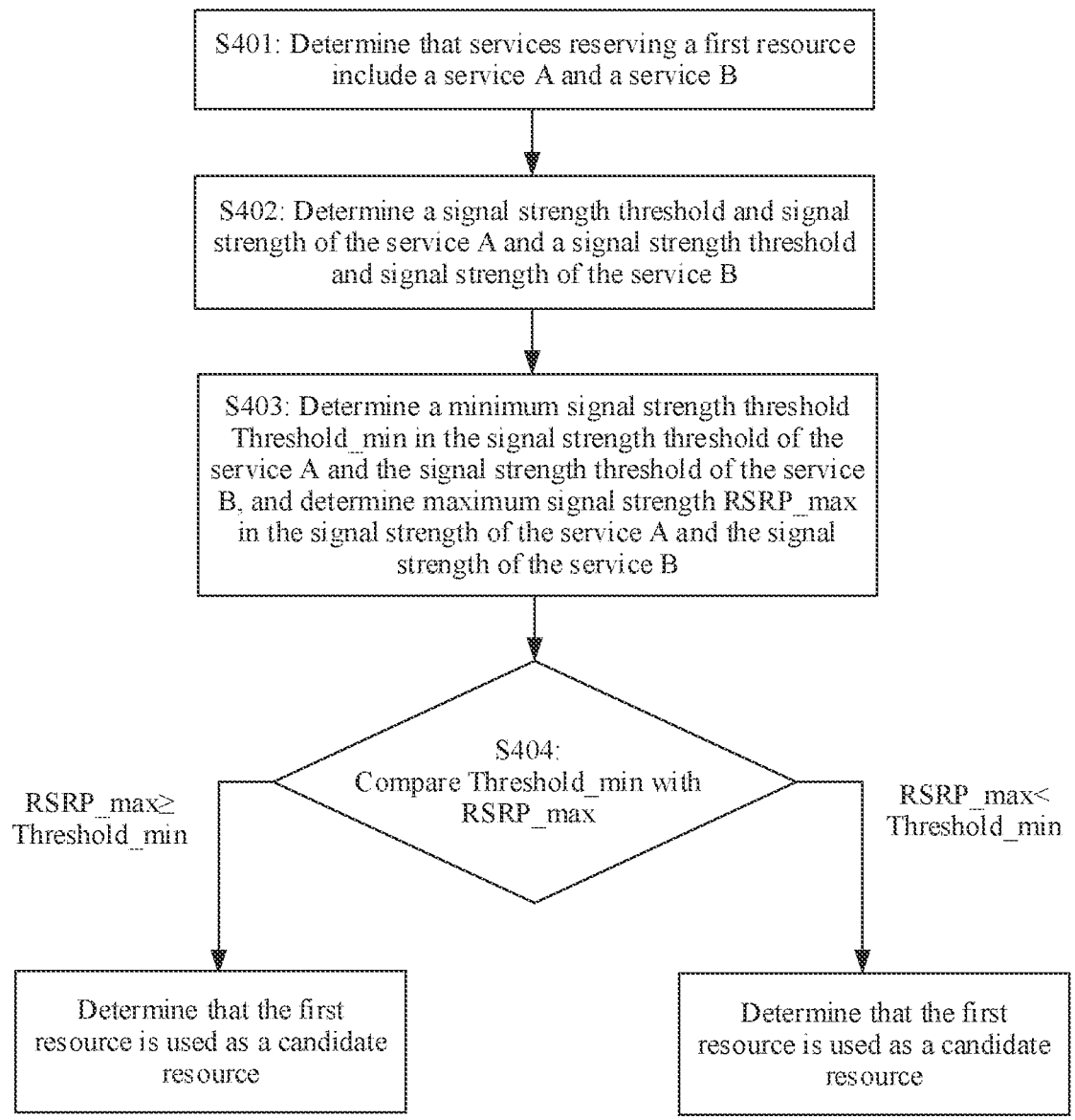
FIG. 6 is a schematic flowchart of a resource determining method according to an embodiment of this application.

If the UE-A determines, based on the minimum signal strength threshold in the signal strength thresholds of the N services that reserve the first resource and the maximum signal strength in the signal strength of the N services, whether the first resource is used as a candidate resource, the resource determining method provided in this embodiment of this application may include the following steps shown in FIG. 6.

S401: The UE-A determines that the services that reserve the first resource include the service A and the service B shown in Table 5 or Table 6.

The UE-A may determine, based on resource information from at least one UE, the first correspondence shown in Table 5 or Table 6. For example, the UE-A may receive resource information from the UE-B, and determine, based on the resource information, that the service A of the UE-B reserves the first resource. In addition, the UE-A may receive resource information from the UE-C, and determine, based on the resource information, that the service A of the UE-C; reserves the first resource. Alternatively, the UE-A may receive resource information from the UE-B, and learn, based on the resource information, that the service A and the service B reserve the first resource. In this case, both the service A and the service B may be services of the UE-B, or are separately services of different UEs. This is not specifically limited herein.

S402: The UE-A determines a signal strength threshold and signal strength of the service A and a signal strength threshold and signal strength of the service B.

The signal strength threshold of the service A is Threshold_A, the signal strength of the service A is RSRP_A, the signal strength threshold of the service B is Threshold_B, and the signal strength of the service B is RSRP_B.

S403: The UE-A determines a minimum signal strength threshold (denoted as Threshold_min) in the signal strength threshold of the service A and the signal strength threshold of the service B, and determines maximum signal strength (denoted as RSRP_max) in the signal strength of the service A and the signal strength of the service B.

For example, Threshold_min=min {Threshold_A, Threshold_B}, and RSRP_max=max{RSRP_A, RSRP_B}.

S404: The UE-A compares a value of the minimum signal strength threshold with a value of the maximum signal strength.

If RSRP_max is greater than (or not less than) Threshold_min, the UE-A determines that the first resource is not used as a candidate resource. Otherwise, if RSRP_max is less than (or not greater than) Threshold_min, the UE-A determines that the first resource is used as a candidate resource.

It should be understood that if the services that reserve the first resource further include the service C and the service T) shown in Table 5 or Table 6, in S503. Threshold_min=min{Threshold_A, Threshold_B, Threshold_C, Threshold_D}, and RSRP_max={RSRP_A, RSRP_B, RSRP_C, RSRP_D}. Alternatively, after determining that the service A is a periodic service with a highest priority that reserves the first resource, and that the service B is an aperiodic service with a highest priority that reserves the first resource, the UE-A performs S401 to S404.

Figure 7A:
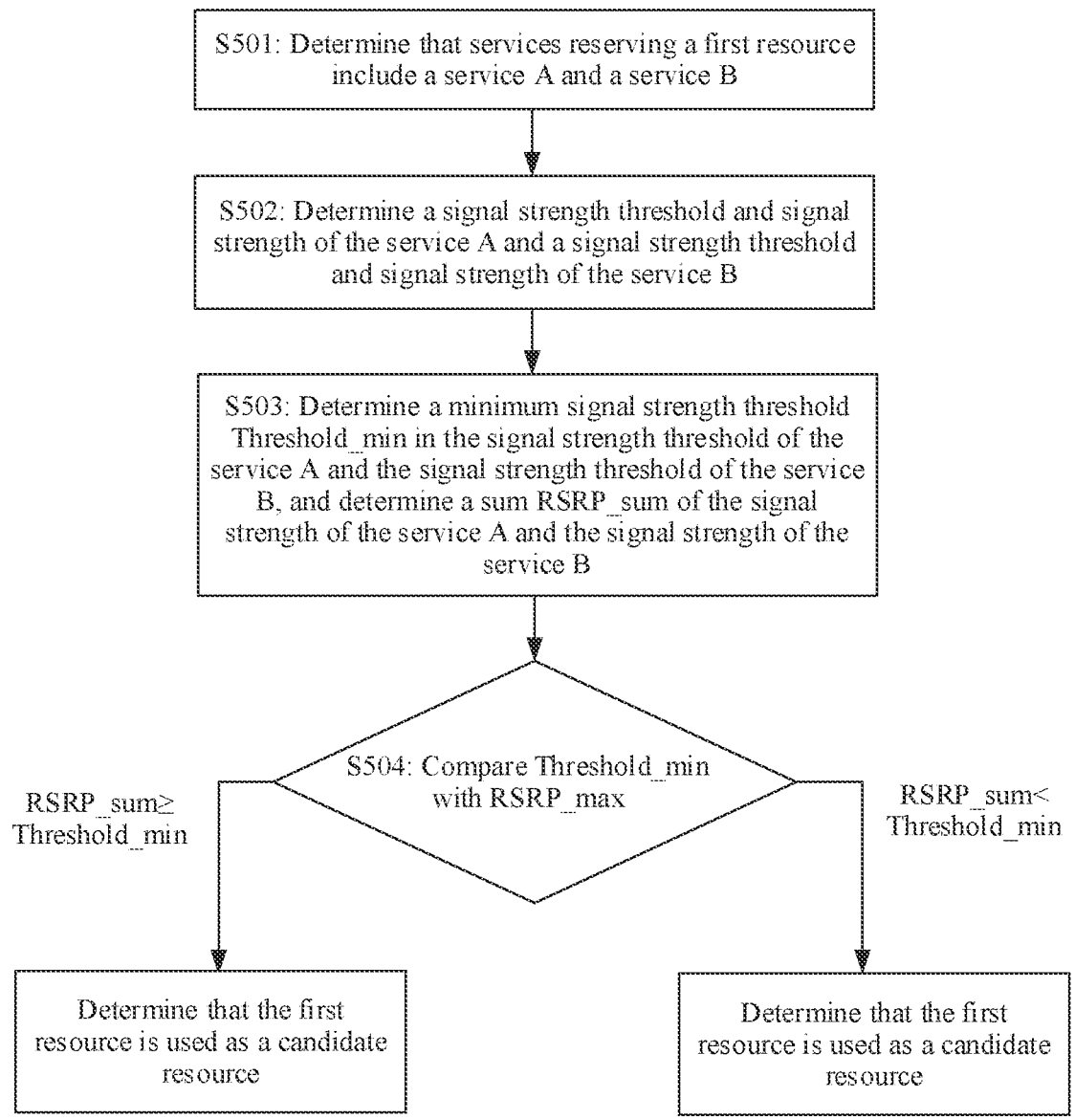
FIG. 7A is a schematic flowchart of a resource determining method according to an embodiment of this application.

If the UE-A determines, based on the minimum signal strength threshold in the signal strength thresholds of the N services that reserve the first resource and a sum of the signal strength of the N services, whether the first resource is used as a candidate resource, the resource determining method provided in this embodiment of this application may include the following steps shown in FIG. 7A.

S501: The UE-A determines that the services that reserve the first resource include the service A and the service B shown in Table 5 or Table 6.

The UE-A may determine, based on resource information from at least one UE, the first correspondence shown in Table 5 or Table 6. For example, the UE-A may receive resource information from the UE-B, and determine, based on the resource information, that the service A of the UE-B reserves the first resource. In addition, the UE-A may receive resource information from the UE-C, and determine, based on the resource information, that the service A of the UE-C reserves the first resource. Alternatively, the UE-A may receive resource information from the UE-B, and learn, based on the resource information, that the service A and the service B reserve the first resource. In this case, both the service A and the service B may be services of the UE-B, or are separately services of different UEs. This is not specifically limited herein.

S502: The UE-A determines a signal strength threshold and signal strength of the service A and a signal strength threshold and signal strength of the service B.

The signal strength threshold of the service A is Threshold_A, the signal strength of the service A is RSRP_A, the signal strength threshold of the service B is Threshold_B, and the signal strength of the service B is RSRP_B.

S503: The UE-A determines a minimum signal strength threshold (denoted as Threshold_min) in the signal strength threshold of the service A and the signal strength threshold of the service B, and determines a sum (denoted as RSRP_sum) of the signal strength of the service A and the signal strength of the service B.

For example, Threshold_min=min{Threshold_A, Threshold_B}, and RSRP_sum=RSRP_A+RSRP_B.

S504: The UE-A compares a value of the minimum signal strength threshold with a value of the sum of the signal strength.

If RSRP_sum is greater than (or not less than) Threshold_min, the UE-A determines that the first resource is not used as a candidate resource; or otherwise, if RSRP_sum is less than (or not greater than) Threshold_min, the UE-A determines that the first resource is used as a candidate resource.

It should be understood that if the services that reserve the first resource further include the service C and the service D shown in Table 5 or Table 6 in S503.

Threshold_min=min{Threshold_A, Threshold_B, Threshold_C, Threshold_D}, and RSRP_sum=RSRP_A+RSRP_B+RSRP_C+RSRP_D. Alternatively, after determining that the service A is a periodic service with a highest priority that reserves the first resource, and that the service B is an aperiodic service with a highest priority that reserves the first resource, the UE-A performs, S501 to S504.

In another possible implementation of S104, when a signal strength threshold of each of the N services is greater than or equal to signal strength of the service to which the signal strength threshold belongs, the UE-A may determine that the first condition is met; in other words, the first resource is determined as a resource in the candidate resource set. Alternatively, the first condition includes: A signal strength threshold of each of the N services (or n services in the N services) is greater than or equal to signal strength of the service to which the signal strength threshold belongs.

On the contrary, if a signal strength threshold of at least one of the N services is less than signal strength of the service to which the signal strength threshold belongs, the first condition is not met, and the UE-A determines that the first resource is not used as a resource in the candidate resource set.

For example, for the resource A shown in Table 2, the UE-A may determine that priorities of the service 1 and the service 2 are respectively 1 and 2. The UE-A may determine a signal strength threshold 1 and RSRP 1 for the service 1, and determine a signal strength threshold 2 and RSRP 2 for the service 2. When the UE-A determines that the signal strength threshold 1 is not less than the RSRP 1 and the signal strength threshold 2 is not less than the RSRP 2, the UE-A determines that the candidate resource set includes the resource A, or the UE-A determines that the resource A is a candidate resource. Otherwise, when the UE-A determines that the signal strength threshold 1 is less than the RSRP 1 or the signal strength threshold 2 is less than the RSRP 2, the UE-A determines that the candidate resource set does not include the resource A, or the UE-A determines that the resource A is not a candidate resource.

In a possible implementation, the UE-A may further determine, based on the signal strength thresholds and the signal strength of the n services in the N services, whether the first condition is met, to reduce computational complexity, where n is less than N, and a proportion of the n services to the N services is not less than a threshold, for example, 50%. The UE-A may determine, when a signal strength threshold of each of the n services is greater than or equal to signal strength of the service to which the signal strength threshold belongs, that the first condition is met, or may determine, when a signal strength threshold of at least one of the n services is less than signal strength of the service to which the signal strength threshold belongs, that the first condition is not met.

For example, then services may include some or all of the following services in the N services: a periodic services with a highest priority, b aperiodic services with a highest priority, c periodic services with a minimum signal strength threshold, d aperiodic services with a minimum signal strength threshold, e periodic services with a smallest difference between a signal strength threshold and signal strength, or f aperiodic services with a smallest difference between a signal strength threshold and signal strength, where a, b, c, d, e, and f are positive integers.

It should be understood that values of a, b, c, d, e, and f may be configured by a base station accessed by the UE-A, or may be pre-stored in the UE-A.

For example, if the n services include the service A and the service B shown in Table 5 or Table 6, the UE-A may determine whether Threshold_A is not greater than RSRP_A (referred to as a first determining result below). If the determining result is yes, the determining result is denoted as "1"; and if the determining result is no, the determining result is denoted as "0". The UE-A determines whether Threshold_B is not greater than RSRP_B (referred to as a second determining result below). If the determining result is yes, the determining result is denoted as "1"; and if the determining result is no, the determining result is denoted as "0". Then, the UE-A may perform an AND/OR operation based on the first determining result and the second determining result, and determine, based on an operation result, whether to use the first resource as a candidate resource.

Specifically, if the first determining result is denoted as "1", the first determining result is denoted as "0", and a result obtained after an AND/OR operation is performed on '1' and "0" is "0", it indicates that the first resource is not used as a candidate resource. If the first determining result is denoted as "0", the first determining result is denoted as "1", and a result obtained after an AND/OR operation is performed on "0" and "1" is "0", it indicates that the first resource is not used as a candidate resource. If the first determining result is denoted as "0", the first determining result is denoted as "0", and a result obtained after an AND/OR operation is performed on "0" and "0" is "0", it indicates that the first resource is not used as a candidate resource. If the first determining result is denoted as "1", the first determining result is denoted as "1", and a result obtained after an AND/OR operation is performed on "1" and "1" is "1", it indicates that the first resource is used as a candidate resource.

After S104, the UE-A may determine the transmission resource based on the candidate resource set, and perform SL transmission based on the transmission resource. When the transmission resource is determined based on the candidate resource set, if the candidate resource set includes the first resource and a second resource, and a quantity of services that reserve the second resource is 1, the UE-A may determine the transmission resource based on a probability of the first resource and a probability of the second resource. The probability is used to indicate a probability that the candidate resource is determined as the transmission resource, and a larger value of the probability indicates a larger probability that the candidate resource is selected as the transmission resource. The probability of the first resource is less than the probability of the second resource, so that a resource reserved by one service is more likely to be designated as the transmission resource, to reduce transmission interference suffered from when service data is sent by using the transmission resource.

For example, if a probability of a candidate resource reserved by no service is a basic probability $g1$, a probability of a candidate resource reserved by one service is $g1$, and a probability of a candidate resource reserved by two services is $g2$, $g2<g1<g0$.

Specifically, the probability of the first resource is k times the probability of the second resource, and k is less than 1. For example, $k=\frac{1}{2}$. For another example, a probability $gN$ of the first resource is related to N, and larger N indicates smaller $gN$. For example, $gN$ and the basic probability $g0$ meet $gNs-g0/(N+1)$, and N is a quantity of services that reserve the first resource. In addition, the probability of the second resource may be l times the basic probability $g0$, and l is less than 1. For example, $l=\frac{1}{2}$.

It should be understood that a quantity of candidate resources determined by the UE-A is Q, and Q is a positive integer. If $f(q)$ is used to represent a probability of a candidate resource reserved by q services, $\Sigma f(q)*q=1$, where $q=0, 1.2, \ldots, Q$. Therefore, the UE-A may determine a probability of each candidate resource.

For example, a sum of probabilities of all candidate resources in the candidate resource set may be set to 1. For example, the probability of the first resource is k times the probability of the second resource, and k=3 (for example, N=2). If the candidate resource set includes the first resource and the second resource, the probability of the first resource is 0.25, and the probability of the second resource is 0.75.

Figure 7B:
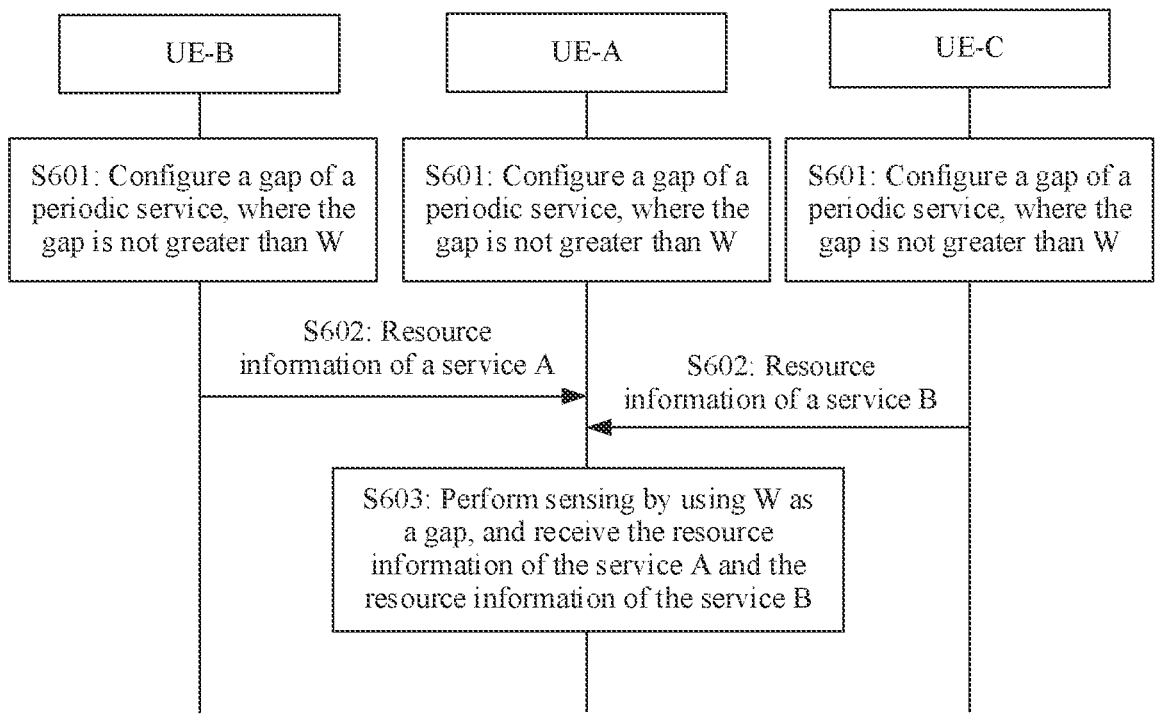
FIG. 7B is a schematic flowchart of a resource determining method according to an embodiment of this application.

As shown in FIG. 7B, an embodiment of this application further provides a method, applied to a scenario in which a periodic service and an aperiodic service coexist, to reduce a quantity of sensing times of UE and reduce sensing power consumption. The method may include the following steps.

S601: UE-A, UE-B, and UE-C configure a gap of a periodic service, where a value of the gap is not greater than (or less than) W slots, and a time domain interval between a resource reserved by an aperiodic service and indicated by resource information and a resource occupied by the resource information does not exceed W slots. For example, W=32.

Optionally, the gap of the periodic service may be configured by a base station or configured by the UE-A, the UE-B, and the UE-C through pre-configuration.

Optionally, a value of W may be configured by the base station or configured by the UE-A, the UE-B, and the UE-C through pre-configuration.

S602: The UE-B sends resource information of a service A, and the UE-C sends resource information of a service B.

The service A is a periodic service, and the service B is an aperiodic service. A gap of the service A does not exceed W.

S603: The UE-A performs sensing by using W as a gap, and receives the resource information of the service A and the resource information of the service B.

Therefore, the UE-A may determine, based on the resource information of the service A and the resource information of the service B, a transmission resource used for sidelink transmission.

In this method, the UE-A does not need to separately set a sensing window for the periodic service and the aperiodic service, and only needs to set the sensing window based on W to meet sensing requirements for the periodic service and the aperiodic service, to reduce a quantity of sensing times and reduce sensing power consumption.

Corresponding to the methods provided in the foregoing method embodiments, an embodiment of this application further provides a corresponding apparatus, including a module configured to execute the foregoing embodiments. The module may be software, hardware, or a combination of software and hardware.

Figure 8:
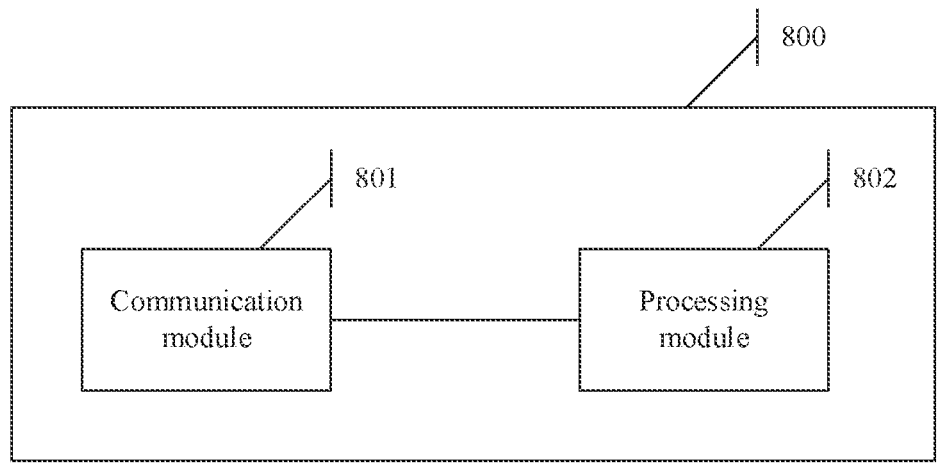
FIG. 8 is a schematic diagram of a structure of a communication apparatus according to an embodiment of this application.

FIG. 8 is a schematic diagram of a structure of an apparatus. An apparatus 800 may be a terminal device, or may be a chip, a chip system, a processor, or the like that can support the terminal device in implementing the foregoing methods. The apparatus 800 may be configured to implement the methods described in the foregoing method embodiments. For details, refer to the descriptions in the foregoing method embodiments.

As shown in FIG. 8, a communication apparatus provided in an embodiment of this application may include a communication module 801 and a processing module 802, and the communication module 801 and the processing module 802 are coupled to each other. The communication apparatus 800 may be configured to perform the steps performed by the first communication apparatus or the third communication apparatus shown in FIG. 4 or FIG. 5. The communication module 801 may be configured to support the communication apparatus 800 in performing communication, and the communication module 801 may also be referred to as a communication unit, a communication interface, a transceiver module, or a transceiver unit. The communication module 801 may have a wireless communication function, for example, may communicate with another communication apparatus in a wireless communication manner. The processing module 802 may also be referred to as a processing unit, and may be configured to support the communication apparatus 800 in performing a processing action performed by the first communication apparatus or the third communication apparatus in the foregoing method embodiments, including but not limited to: generating information and a message that are sent by the communication module 801, and/or demodulating and decoding a signal received by the communication module 801.

In a possible design, when performing the steps performed by the terminal device in the foregoing method embodiments, the processing module 802 may obtain resource information of at least N services of a plurality of second terminal devices. The resource information may include information of a first resource, the first resource is a resource that is jointly reserved by N services, and N is greater than or equal to 2.

The resource information of the at least N services may be received by the communication module 801 and sent to the processing module 802.

The processing module 802 may further determine signal strength thresholds of the N services based on the information of the first resource, and determine signal strength of the N services based on signal strength of resource information of the N received services. When the signal strength thresholds of the N services and the signal strength of the N services meet a first condition, the processing module 802 may be further configured to determine that a candidate resource set includes the first resource.

Ina possible design, the processing module 802 may determine a first signal strength threshold based on the signal strength thresholds of the N services. The first signal strength threshold includes a signal strength threshold of a service with a highest priority in the N services, a signal strength threshold of a service with a smallest difference between a signal strength threshold and signal strength in the N services, or a minimum signal strength threshold in signal strength thresholds of m services, where the m services are some or all services in the N services, in is a positive integer, and in is less than or equal to N. With this design, a more flexible manner of determining the first signal strength threshold can be implemented.

In a possible design, the processing module 802 may further determine a second signal strength threshold based on the signal strength thresholds of the N services, and determine a first signal strength threshold based on the second signal strength threshold and a value M, where the first signal strength threshold is a signal strength threshold of one of the N services. M is a constant, or M is determined based on N. The second signal strength threshold includes a signal strength threshold of a service with a highest priority in the N services, a signal strength threshold of a service with a smallest difference between a signal strength threshold and signal strength in the N services, or a minimum signal strength threshold in signal strength thresholds of m services, where the m services are some or all services in the N services, m is a positive integer, and m is less than or equal to N.

In a possible design, the first signal strength is determined based on signal strength of the service with the highest priority in the N services; the first signal strength is determined based on signal strength of a service with a minimum signal strength threshold in the N services; the first signal strength is determined based on signal strength of a service with a smallest difference between a signal strength threshold and signal strength in the in services; where the in services are some or all services in the N services, in is a positive integer, and m is less than or equal to N; the first signal strength is determined based on maximum signal strength in signal strength of the in services; or the first signal strength is a sum of signal strength of the m services. With this design, a more flexible manner of determining the first signal strength can be implemented.

In a possible example, the first condition includes: The first signal strength threshold is greater than or equal to the first signal strength.

Ina possible design, the processing module 802 may further determine the service with the highest priority from a periodic service with a highest priority and an aperiodic service with a highest priority in the N services based on the priority of the periodic service with the highest priority and the priority of the aperiodic service with the highest priority.

Ina possible design, the m services include the periodic service with the highest priority in the N services and/or the aperiodic service with the highest priority in the N services. With this design, a more proper resource determining manner can be implemented based on the periodic service with the highest priority and/or the aperiodic service with the highest priority.

In a possible design, the first condition includes: The first signal strength threshold is greater than or equal to the first signal strength. Therefore, whether to use the first resource as a candidate resource is flexibly determined based on first signal threshold strength and the first signal strength.

In a possible design, the candidate resource set includes the first resource and a second resource, the second resource is reserved by a periodic service or an aperiodic service, the processing module 802 may further determine a transmission resource based on a probability of the first resource and a probability of the second resource, the transmission resource may be used by the terminal device to perform sidelink transmission, and the probability of the first resource is less than the probability of the second resource.

Ina possible design, the N services are sidelink transmission services.

Figure 9:
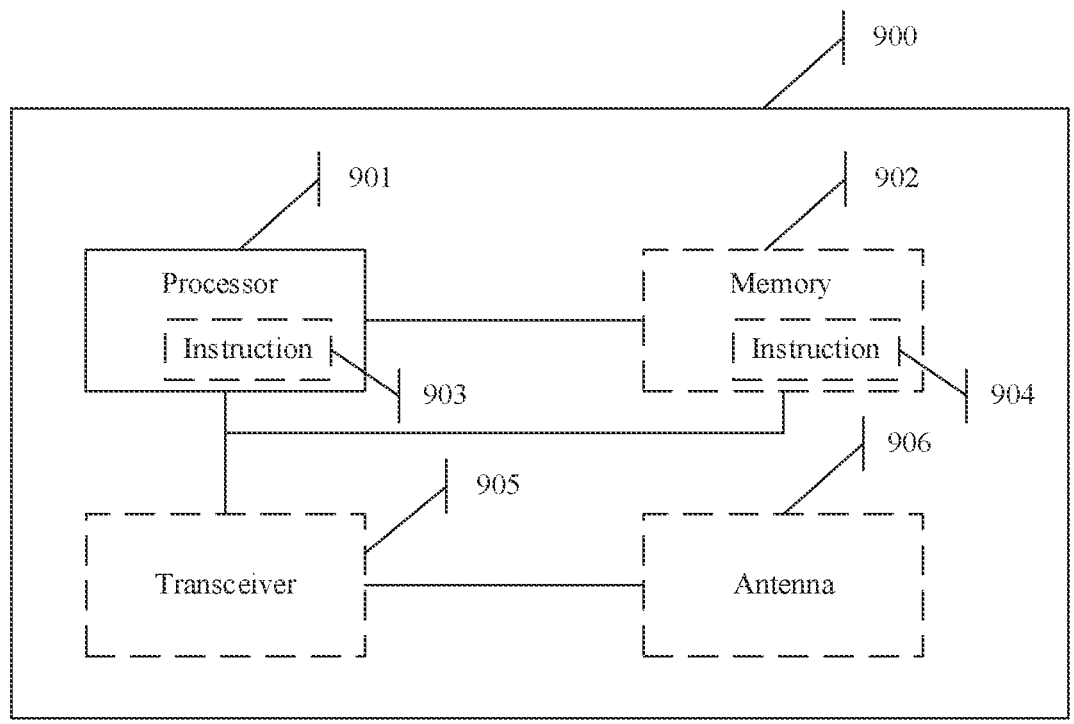
FIG. 9 is a schematic diagram of a structure of another communication apparatus according to an embodiment of this application.

FIG. 9 is a schematic diagram of a structure of another communication apparatus according to an embodiment of this application. The communication apparatus may be implemented by a hardware component. An apparatus 900 shown in FIG. 9 may be a first communication apparatus, or may be a chip, a chip system, a processor, or the like that supports the first communication apparatus in implementing the foregoing methods. Alternatively, the apparatus 900 may be a third communication apparatus, or may be a chip, a chip system, a processor, or the like that supports the third communication apparatus in implementing the foregoing methods. The apparatus 900 may be configured to implement the methods performed by the first communication apparatus or the third communication apparatus and described in the foregoing method embodiments. For details, refer to the descriptions in the foregoing method embodiments. The apparatus 900 has a function of implementing the first communication apparatus or the third communication apparatus described in embodiments of this application. For example, the apparatus 900 includes a corresponding module, unit, or means (means) used by the first communication apparatus or the third communication apparatus to perform steps related to the terminal described in embodiments of this application. The function, the unit, or the means may be implemented by using software, may be implemented by using hardware, may be implemented by hardware by executing corresponding software, or may be implemented by using a combination of software and hardware. For details, refer to the corresponding descriptions in the foregoing corresponding method embodiment.

The apparatus 900 may include one or more processors 901, and the processor 901 may also be referred to as a processing unit, and can implement a specific control function. The processor 901 may be a general-purpose processor, a dedicated processor, or the like. For example, the processor may be a baseband processor or a central processing unit. The baseband processor may be configured to process a communication protocol and communication data. The central processing unit may be configured to control the communication apparatus (for example, a base station, a baseband chip, a terminal, a terminal chip, a distributed unit (distributed unit, DU), or a centralized unit (centralized unit, CU)), execute a software program, and process data of the software program.

In an optional design, the processor 901 may store instructions 903 and/or data, and the instructions 903 and/or the data may be run by the processor, so that the apparatus 900 is enabled to perform the methods described in the foregoing method embodiments.

In another optional design, the processor 901 may include a transceiver unit configured to implement a receiving/sending function. For example, the transceiver unit may be a transceiver circuit, an interface, or an interface circuit. Transceiver circuits, interfaces, or interface circuits configured to implement the receiving and sending functions may be separated, or may be integrated together. The transceiver circuit, the interface, or the interface circuit may be configured to read and write code/data. Alternatively, the transceiver circuit, the interface, or the interface circuit may be configured to transmit or transfer a signal.

In still another possible design, the apparatus 900 may include a circuit, and the circuit may implement a transmitting, receiving, or communication function in the foregoing method embodiments.

Optionally, the apparatus 900 may include one or more memories 902 that may store instructions 904, and the instructions may be run on the processor, so that the apparatus 900 is enabled to perform the methods described in the foregoing method embodiments. Optionally, the memory may further store data. Optionally, the processor may also store instructions and or data. The processor and the memory may be separately disposed, or may be integrated together. For example, the correspondence described in the foregoing method embodiments may be stored in the memory or stored in the processor. The processor 901 and/or the memory 902 may be considered as the processing module 802 shown in FIG. 8.

Optionally, the apparatus 900 may further include a transceiver 905 and/or an antenna 906. The processor 901 may be referred to as a processing unit, and controls the apparatus 900. The transceiver 905 may be referred to as a transceiver unit, a transceiver, a transceiver circuit, a transceiver apparatus, a transceiver module, or the like, and is configured to implement a receiving/sending function. The transceiver 905 and/or the antenna 906 may be considered as the communication module 801 shown in FIG. 8.

Optionally, the apparatus 900 in this embodiment of this application may be configured to perform the methods described in the foregoing embodiments of this application. The processor 901 may be configured to perform steps performed by the processing module 802 shown in FIG. 8, and the transceiver 905 may be configured to perform steps performed by the communication module 801 shown in FIG. 8. For specific steps performed by the processor 901 and the transceiver 905, refer to descriptions of the steps performed by the processing module 802 or the communication module 801 in the foregoing part of FIG. 8. Details are not described herein again.

Figure 10:
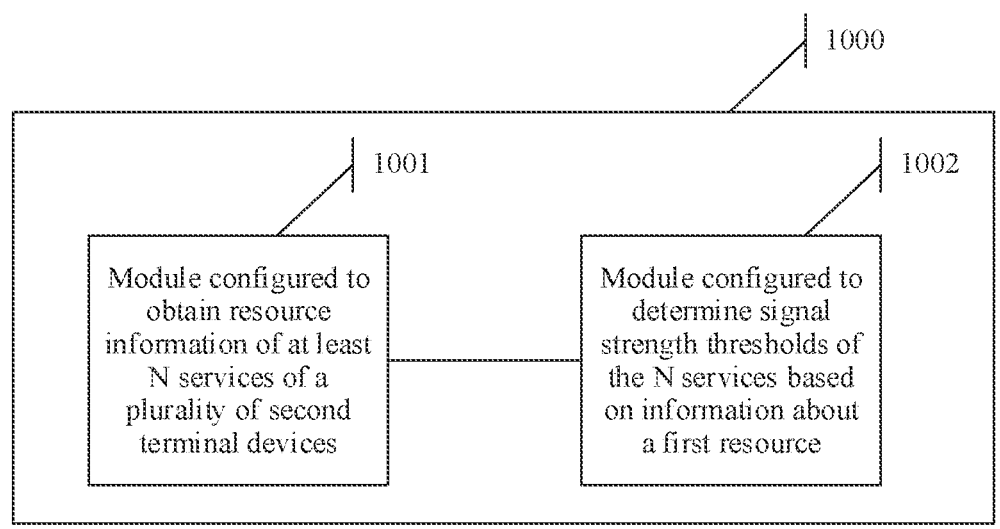
FIG. 10 is a schematic diagram of a structure of another communication apparatus according to an embodiment of this application.

As shown in FIG. 10, a structure of another communication apparatus 1000 provided in an embodiment of this application may include a module 1001 configured to obtain resource information of at least N services of a plurality of second terminal devices, where the resource information may include information of a first resource, the first resource is a resource reserved by N services, and N is greater than or equal to 2; and include a module 1002 configured to determine signal strength thresholds of the N services based on the information of the first resource.

The module 1002 configured to determine the signal strength thresholds of the N services based on the information of the first resource may be further configured to determine signal strength of the N services based on signal strength of resource information of the N received services. When the signal strength thresholds of the N services and the signal strength of the N services meet a first condition, the module 1002 configured to determine the signal strength thresholds of the N services based on the information of the first resource may be further configured to determine that a candidate resource set includes the first resource.

In a possible design, the information of the first resource includes at least one of priority information of the N services, an index of the first resource, time-frequency location information of the first resource, or type information of the N services.

Ina possible design, the information of the first resource includes the priority information of the N services, and the module 1002 configured to determine the signal strength thresholds of the N services based on the information of the first resource may be further configured to determine the signal strength thresholds of the N services based on the priority information of the N services.

In a possible design, the module 1002 configured to determine the signal strength thresholds of the N services based on the information of the first resource may be further configured to determine a first signal strength threshold based on the signal strength thresholds of the N services. The first signal strength threshold includes a signal strength threshold of a service with a highest priority in the N services, a signal strength threshold of a service with a smallest difference between a signal strength threshold and signal strength in the N services, or a minimum signal strength threshold in signal strength thresholds of m services, where the m services are some or all services in the N services, m is a positive integer, and m is less than or equal to N.

Ina possible design, the module 1002 configured to determine the signal strength thresholds of the N services based on the information of the first resource may be further configured to determine a second signal strength threshold based on the signal strength thresholds of the N services, and determine a first signal strength threshold based on the second signal strength threshold and a value M, where the first signal strength threshold is a signal strength threshold of one of the N services. M is a constant, or M is determined based on N. The second signal strength threshold includes a signal strength threshold of a service with a highest priority in the N services, a signal strength threshold of a service with a smallest difference between a signal strength threshold and signal strength in the N services, or a minimum signal strength threshold in signal strength thresholds of m services, where the m services are some or all services in the N services, in is a positive integer, and m is less than or equal to N.

In a possible design, the first signal strength is determined based on signal strength of the service with the highest priority in the N services; the first signal strength is determined based on signal strength of a service with a minimum signal strength threshold in the N services; the first signal strength is determined based on signal strength of a service with a smallest difference between a signal strength threshold and signal strength in the m services, where the m services are some or all services in the N services, m is a positive integer, and m is less than or equal to N; the first signal strength is determined based on maximum signal strength in signal strength of the m services; or the first signal strength is a sum of signal strength of the in services.

Ina possible design, the module 1002 configured to determine the signal strength thresholds of the N services based on the information of the first resource may be further configured to determine the service with the highest priority from a periodic service with a highest priority and an aperiodic service with a highest priority in the N services based on the priority of the periodic service with the highest priority and the priority of the aperiodic service with the highest priority.

In a possible design, the in services include the periodic service with the highest priority in the N services and/or the aperiodic service with the highest priority in the N services.

In a possible design, the first condition includes: The first signal strength threshold is greater than or equal to the first signal strength. Therefore, whether to use the first resource as a candidate resource is flexibly determined based on first signal threshold strength and the first signal strength.

Ina possible design, the candidate resource set includes the first resource and a second resource, the second resource is reserved by a periodic service or an aperiodic service, the module 1002 configured to determine the signal strength thresholds of the N services based on the information of the first resource may be further configured to determine a transmission resource based on a probability of the first resource and a probability of the second resource, the transmission resource may be used by the terminal device to perform sidelink transmission, and the probability of the first resource is less than the probability of the second resource.

In a possible design, the N services are sidelink transmission services.

The processor and the transceiver described in this application may be implemented in an integrated circuit (integrated circuit, IC), an analog IC, a radio frequency integrated circuit RFIC, a mixed signal IC, an application specific integrated circuit (application specific integrated circuit, ASIC), a printed circuit board (printed circuit board. PCB), an electronic device, and the like. The processor and the transceiver may alternatively be fabricated by using various IC process technologies, such as a complementary metal oxide semiconductor (complementary metal oxide semiconductor, CMOS), an N-metal-oxide-semiconductor (nMetal-oxide-semiconductor, NMOS), a P-channel metal-oxide-semiconductor (positive channel metal oxide semiconductor, PMOS), a bipolar junction transistor (Bipolar Junction Transistor, BJT), a bipolar CMOS (BiCMOS), silicon germanium (SiGe), and gallium arsenide (GaAs).

The apparatus in the descriptions of the foregoing embodiments may be a terminal device, but a range of the apparatus described in this application is not limited thereto, and a structure of the apparatus may not be limited by FIG.

9. The apparatus may be an independent device or may be a part of a large device. For example, the apparatus may be:
  (1) an independent integrated circuit IC, a chip, or a chip system or subsystem;
  (2) a set of one or more ICs, where optionally, the IC set may also include a storage component configured to store data and/or instructions;
  (3) an ASIC, for example, a modern (MSM);
  (4) a module that can be embedded in another device;
  (5) a receiver, a terminal, a smart terminal, a cellular phone, a wireless device, a handset, a mobile unit, a vehicle-mounted device, a network device, a cloud device, an artificial intelligent device, a machine device, a household device, a medical device, an industrial device, or the like; or
  (6) others.

With reference to the foregoing descriptions, this application further provides the following embodiments. It should be noted that numbers of the following embodiments do not necessarily need to comply with a numbering sequence of the foregoing embodiments.

Embodiment 1: A resource determining method is provided, where the method is applied to a terminal device and includes:
  obtaining resource information of at least N services of a plurality of second terminal devices, where the resource information includes information of a first resource, the first resource is a resource that is jointly reserved by N services, and N is greater than or equal to 2;
    determining signal strength thresholds of the N services based on the information of the first resource:
    determining signal strength of the N services based on signal strength of resource information of the N received services; and
    when the signal strength thresholds of the N services and the signal strength of the N services meet a first condition, determining that a candidate resource set includes the first resource.

Embodiment 2: Based on the method described in Embodiment 1, the information of the first resource includes at least one of the following:
  priority information of the N services;
  an index of the first resource;
  time-frequency location information of the first resource; or
  type information of the N services.

Embodiment 3: Based on the method described in Embodiment 2, the determining signal strength thresholds of the N services based on the information of the first resource includes:
  determining the signal strength thresholds of the N services based on the priority information of the N services.

Embodiment 4: Based on the method described in any one of Embodiment 1 to Embodiment 3, the method further includes:
  determining a first signal strength threshold based on the signal strength thresholds of the N services, where
  the first signal strength threshold includes:
    a signal strength threshold of a service with a highest priority in the N services;
    a signal strength threshold of a service with a smallest difference between a signal strength threshold and signal strength in the N services; or
    a minimum signal strength threshold in signal strength thresholds of m services, where the m services are some or all services in the N services, m is a positive integer, and m is less than or equal to N.

Embodiment 5: Based on the method described in any one of Embodiment 1 to Embodiment 3, the method further includes:
  determining a second signal strength threshold based on the signal strength thresholds of the N services; and
  determining a first signal strength threshold based on the second signal strength threshold and a value M, where the first signal strength threshold is a signal strength threshold of one of the N services, where
  M is a constant, or M is determined based on N; and
  the second signal strength threshold includes:
    a signal strength threshold of a service with a highest priority in the N services;
    a signal strength threshold of a service with a smallest difference between a signal strength threshold and signal strength in the N services; or
    a minimum signal strength threshold in signal strength thresholds of m services, where the m services are some or all services in the N services, m is a positive integer, and m is less than or equal to N.

Embodiment 6: Based on the method described in Embodiment 4 or Embodiment 5, the method further includes:
  determining first signal strength based on the signal strength of the N services, where
  the first signal strength is determined based on signal strength of the service with the highest priority in the N services;
  the first signal strength is determined based on signal strength of a service with a minimum signal strength threshold in the N services;
  the first signal strength is determined based on signal strength of a service with a smallest difference between a signal strength threshold and signal strength in the m services, where the in services are some or all services in the N services, m is a positive integer, and m is less than or equal to N:
  the first signal strength is determined based on maximum signal strength in signal strength of the m services; or
  the first signal strength is a sum of signal strength of the m services.

Embodiment 7: Based on the method described in Embodiment 6, the first condition includes:
  the first signal strength threshold is greater than or equal to the first signal strength.

Embodiment 8: Based on the method described in any one of Embodiment 4 to Embodiment 7, the method further includes:
  determining the service with the highest priority from a periodic service with a highest priority and an aperiodic service with a highest priority in the N services based on the priority of the periodic service with the highest priority and the priority of the aperiodic service with the highest priority.

Embodiment 9: Based on the method described in any one of Embodiment 4 to Embodiment 8, the method further includes:
  determining the service with the highest priority from a periodic service with a highest priority and an aperiodic service with a highest priority in the N services based on the priority of the periodic service with the highest priority and the priority of the aperiodic service with the highest priority.

Embodiment 10: Based on the method described in any one of Embodiment 1 to Embodiment 3, the first condition includes:
a signal strength threshold of each of the N services is greater than or equal to signal strength of the service to which the signal strength threshold belongs.

Embodiment 11: Based on the method described in any one of Embodiment 1 to Embodiment 10, the candidate resource set includes the first resource and a second resource, where the second resource is reserved by a periodic service or an aperiodic service, and the method further includes:
determining a transmission resource based on a probability of the first resource and a probability of the second resource, where the probability of the first resource is less than the probability of the second resource.

Embodiment 12: Based on the method described in any one of Embodiment 1 to Embodiment 11, the N services are services of the plurality of second terminal devices.

Embodiment 13: A communication apparatus is provided and includes:
a module configured to obtain resource information of at least N services of a plurality of second terminal devices, where the resource information includes information of a first resource, the first resource is a resource that is jointly reserved by N services, and N is greater than or equal to 2; and
a module configured to determine signal strength thresholds of the N services based on the information of the first resource, where
the module configured to determine the signal strength thresholds of the N services based on the information of the first resource is further configured to determine signal strength of the N services based on signal strength of resource information of the N received services; and
when the signal strength thresholds of the N services and the signal strength of the N services meet a first condition, the module configured to determine the signal strength thresholds of the N services based on the information of the first resource is further configured to determine that a candidate resource set includes the first resource.

Embodiment 14: Based on the method described in Embodiment 13, the information of the first resource includes at least one of the following:
priority information of the N services;
an index of the first resource;
time-frequency location information of the first resource; or
type information of the N services.

Embodiment 15: Based on the communication apparatus described in Embodiment 14, the module configured to determine the signal strength thresholds of the N services based on the information of the first resource is specifically configured to:
determine the signal strength thresholds of the N services based on the priority information of the N services.

Embodiment 16: Based on the communication apparatus described in any one of Embodiment 13 to Embodiment 15, the module configured to determine the signal strength thresholds of the N services based on the information of the first resource is further configured to:
determine a first signal strength threshold based on the signal strength thresholds of the N services, where the first signal strength threshold includes:
a signal strength threshold of a service with a highest priority in the N services;
a signal strength threshold of a service with a smallest difference between a signal strength threshold and signal strength in the N services; or
a minimum signal strength threshold in signal strength thresholds of m services, where the m services are some or all services in the N services, m is a positive integer, and m is less than or equal to N.

Embodiment 17: Based on the communication apparatus described in any one of Embodiment 13 to Embodiment 15, the module configured to determine the signal strength thresholds of the N services based on the information of the first resource is further configured to:
determine a second signal strength threshold based on the signal strength thresholds of the N services; and
determine a first signal strength threshold based on the second signal strength threshold and a value M, where the first signal strength threshold is a signal strength threshold of one of the N services, where
M is a constant, or M is determined based on N; and
the second signal strength threshold includes:
a signal strength threshold of a service with a highest priority in the N services;
a signal strength threshold of a service with a smallest difference between a signal strength threshold and signal strength in the N services; or
a minimum signal strength threshold in signal strength thresholds of m services, where the m services are some or all services in the N services, m is a positive integer, and m is less than or equal to N.

Embodiment 18: Based on the communication apparatus described in Embodiment 16 or Embodiment 17, the module configured to determine the signal strength thresholds of the N services based on the information of the first resource is further configured to:
determine first signal strength based on the signal strength of the N services; where
the first signal strength is determined based on signal strength of the service with the highest priority in the N services;
the first signal strength is determined based on signal strength of a service with a minimum signal strength threshold in the N services;
the first signal strength is determined based on signal strength of a service with a smallest difference between a signal strength threshold and signal strength in the m services, where the m services are some or all services in the N services, m is a positive integer, and mu is less than or equal to N;
the first signal strength is determined based on maximum signal strength in signal strength of the m services; or
the first signal strength is a sum of signal strength of the m services.

Embodiment 19: Based on the communication apparatus described in any one of Embodiment 16 to Embodiment 18, the first condition includes:
the first signal strength threshold is greater than or equal to the first signal strength.

Embodiment 20: Based on the communication apparatus described in Embodiment 19, the module configured to determine the signal strength thresholds of the N services based on the information of the first resource is further configured to:
determine the service with the highest priority from a periodic service with a highest priority and an aperiodic service with a highest priority in the N services based on the priority of the periodic service with the highest priority and the priority of the aperiodic service with the highest priority.

Embodiment 21: Based on the communication apparatus described in any one of Embodiment 16 to Embodiment 20, the m services include:
the periodic service with the highest priority in the N services: and/or the aperiodic service with the highest priority in the N services.

Embodiment 22: Based on the communication apparatus described in any one of Embodiment 13 to Embodiment 15, the first condition includes:
a signal strength threshold of each of the N services is greater than or equal to signal strength of the service to which the signal strength threshold belongs.

Embodiment 23: The communication apparatus according to any one of Embodiment 13 to Embodiment 22; the candidate resource set includes the first resource and a second resource; the second resource is reserved by a periodic service or an aperiodic service, and the module configured to determine the signal strength thresholds of the N services based on the information of the first resource is further configured to:
determine a transmission resource based on a probability of the first resource and a probability of the second resource, where the probability of the first resource is less than the probability of the second resource.

Embodiment 24: Based on the communication apparatus described in any one of Embodiment 13 to Embodiment 23, the N services are services of the plurality of second terminal devices.

Embodiment 25: A resource determining method is provided, where the method is applied to a terminal device and includes:
determining, a reservation gap of a periodic service, where the gap is less than or equal to a reservation upper limit W of an aperiodic service; and
sensing, based on WI, resources reserved by, the periodic service and the aperiodic service.

Embodiment 26: Based on the method described in Embodiment 25, the method further includes:
receiving configuration information from a network device, where the configuration information is used to indicate the gap.

Embodiment 27: A communication apparatus is provided and includes:
a processing module, configured to determine a reservation gap of a periodic service, where the gap is less than or equal to a reservation upper limit W of an aperiodic service; and
a communication module, configured to sense, based on W resources reserved by the periodic service and the aperiodic service.

Embodiment 28: Based on the communication apparatus described in Embodiment 27, the communication module is configured to:
receive configuration information from a network device, where the configuration information is used to indicate the gap.

Embodiment 29: A resource determining method is provided, where the method is applied to a terminal device and includes:
determining a third resource, where no service reserves the third resource outside a DRX period; and
determining that a candidate resource set does not include the third resource; or when a quantity of candidate resources in a candidate resource set is less than a threshold or a proportion of candidate resources in the candidate resource set to all resources in a resource pool is less than or equal to a threshold, determining that the candidate resource set includes the third resource.

Embodiment 30: A communication apparatus is provided and includes:
a module configured to determine a third resource, where no service reserves the third resource outside a DRX period; and
a processing module, configured to determine that a candidate resource set does not include the third resource; or configured to: when a quantity of candidate resources in a candidate resource set is less than a threshold or a proportion of candidate resources in the candidate resource set to all resources in a resource pool is less than or equal to a threshold, determine that the candidate resource set includes the third resource.

Embodiment 31: A communication apparatus is provided and includes a processor and a memory, where
the memory is configured to store program instructions; and
the processor is configured to invoke the program instructions in the memory, to perform the method described in any one of Embodiment 1 to Embodiment 12, Embodiment 25 and Embodiment 26, or Embodiment 29.

Embodiment 32: Based on the communication apparatus described in Embodiment 31, the communication apparatus is a terminal device, a chip, or a chip system.

Embodiment 33: A computer-readable medium is provided, where the computer-readable medium stores a program or instructions, and when the program or the instructions are executed, a computer is enabled to perform the method described in any one of Embodiment 1 to Embodiment 12, Embodiment 25 and Embodiment 26, or Embodiment 29.

Embodiment 34: Based on the method described in any one of Embodiment 1 to Embodiment 12. Embodiment 25 and Embodiment 26, or Embodiment 29, the N services are sidelink transmission services.

It should be understood that, in the foregoing embodiments, a component included in the communication apparatus is an example, and is merely a possible example. In actual implementation, the component may have another composition manner. In addition, the components in the foregoing communication apparatus may be integrated into one module, or may separately physically exist. The integrated module may be implemented in a form of hardware, or may be implemented in a form of a software functional module, and this should not be construed as being limited to the structure shown in the foregoing accompanying drawings.

Based on a same concept as that of the foregoing method embodiments, an embodiment of this application further provides a computer-readable storage medium, and a computer program is stored on the computer-readable storage medium. When the program is executed by a processor, the computer is enabled to perform an operation performed by the first communication apparatus or the third communication apparatus in the foregoing method embodiments or any possible implementation of the method embodiments.

Based on a same concept as that of the foregoing method embodiments, an embodiment of this application further provides a computer program product. When the computer program product is invoked and executed, a computer may be enabled to implement an operation performed by the first communication apparatus or the third communication apparatus in the foregoing method embodiments or any possible implementation of the method embodiments.

Based on a same concept as that of the foregoing method embodiments, this application further provides a chip or a chip system, and the chip may include a processor. The chip may further include a memory (or a storage module) and/or a transceiver (or a communication module). Alternatively, the chip is coupled to a memory (or a storage module) and/or a transceiver (or a communication module). The transceiver (or the communication module) may be configured to support the chip in performing wired and/or wireless communication. The memory (or the storage module) may be configured to store a program. The processor invokes the program to implement an operation performed by the first communication apparatus or the third communication apparatus in the foregoing method embodiments or any possible implementation of the method embodiments. The chip system may include the foregoing chip, or may include the foregoing chip and another discrete component, such as the memory (or the storage module) and/or the transceiver (or the communication module).

It should be understood that the memory in this application may be configured to store at least a computer program or an instruction, and/or store information and data in embodiments of this application. The computer program may be invoked by the processor (or a processing unit or a processing module) to perform the methods in embodiments of this application. The memory may be a flash (flash) memory, a read-only memory (read-only memory, ROM) or another type of static storage device that can store static information and instructions, or a random access memory (random access memory, RAM) or another type of dynamic storage device that can store information and instructions, or may be an electrically erasable programmable read-only memory (electrically erasable programmable read-only memory, EEPROM), a compact disc read-only memory (compact disc read-only memory, CD-ROM) or another optical disk storage, an optical disc storage (including a compact disc, a laser disc, an optical disc, a digital versatile disc, a Blu-ray disc, or the like), a disk storage medium or another magnetic storage device, or any other medium that can be used to carry or store expected program code in a form of instructions or a data structure and that can be accessed by a computer. However, the memory is not limited thereto. The memory may exist independently, and is connected to the processor by using a communication bus. Alternatively, the memory may be integrated with the processor.

Based on a same concept as that of the foregoing method embodiments, this application further provides a communication system, and the communication system may be configured to implement an operation performed by the first communication apparatus or the third communication apparatus in the foregoing method embodiments or any possible implementation of the method embodiments. For example, the communication system has the architecture shown in FIG. 1A or FIG. 1B.

Embodiments of this application are described with reference to a flowchart and/or a block diagram of a method, an apparatus, and a computer program product related to the embodiments. It should be understood that computer program instructions may be used to implement each procedure and/or each block in the flowcharts and/or the block diagrams and a combination of a procedure and/or a block in the flowcharts and/or the block diagrams. The computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

The computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

The computer program instructions may alternatively be loaded onto a computer or another programmable data processing device, so that a series of operations and steps are performed on the computer or the another programmable device to generate computer-implemented processing. Therefore, the instructions executed on the computer or the another programmable device provide steps for implementing a specific function in one or more procedures in the flowcharts and/or in one or more blocks in the block diagrams.

What is claimed is:

1. A resource determining method implemented by a first terminal device, wherein the resource determining method comprises:
receiving, from a plurality of second terminal devices, first resource information of a first service and second resource information of a second service, wherein each of the first resource information and the second resource information comprises information of a first resource, wherein the first resource is jointly reserved by the first service and the second service;
either:
determining, based on the first resource information and the second resource information, a first signal strength threshold corresponding to the first service, a first signal strength of the first resource information, and a first candidate resource set for determining a resource for transmission, wherein the first candidate resource set does not comprise the first resource when the first signal strength is greater than the first signal strength threshold; or
determining, based on the first resource information and the second resource information, a second signal strength threshold corresponding to the second service, a second signal strength of the second resource information, and a second candidate resource set, wherein the second candidate resource set does not comprise the first resource when the second signal strength is greater than the second signal strength threshold; and
determining the second signal strength threshold based on first priority information of the first service and second priority information of the second service.

2. The resource determining method of claim 1, wherein the first resource information comprises first priority information of the first service, and wherein the second resource information comprises second priority information of the second service.

3. The resource determining method of claim 1, wherein the information of the first resource comprises at least one of:
   an index of the first resource; or
   time-frequency location information of the first resource.

4. The resource determining method of claim 1, further comprising further determining the first signal strength threshold based on first priority information of the first service and second priority information of the second service.

5. The resource determining method of claim 1, wherein the first signal strength threshold comprises at least one of the following: a signal strength threshold of a service with a highest priority in the first service and the second service; a signal strength threshold of a service with a smallest difference between a signal strength threshold and signal strength in the first service and the second service; or a minimum signal strength threshold in signal strength thresholds of the first service and the second service.

6. The resource determining method of claim 1, wherein the second signal strength threshold comprises at least one of the following: a signal strength threshold of a service with a highest priority in the first service and the second service; a signal strength threshold of a service with a smallest difference between a signal strength threshold and signal strength in the first service and the second service; or a minimum signal strength threshold in signal strength thresholds of the first service and the second service.

7. The resource determining method of claim 1, wherein the first service and the second service are sidelink transmission services.

8. A first terminal device comprising:
   a memory configured to store instructions; and
   a processor coupled to the memory and configured to execute the instructions to cause the first terminal device to:
      receive, from a plurality of second terminal devices, first resource information of a first service and second resource information of a second service, wherein each of the first resource information and the second resource information comprises information of a first resource, wherein the first resource is jointly reserved by the first service and the second service;
      either:
         determine, based on the first resource information and the second resource information, a first signal strength threshold corresponding to the first service, a first signal strength of the first resource information, and a first candidate resource set for determining a resource for transmission, wherein the first candidate resource set does not comprise the first resource when the first signal strength is greater than the first signal strength threshold; or
         determine, based on the first resource information and the second resource information, a second signal strength threshold corresponding to the second service, a second signal strength of the second resource information, and a second candidate resource set, wherein the second candidate resource set does not comprise the first resource when the second signal strength is greater than the second signal strength threshold; and
      determine the first signal strength threshold based on first priority information of the first service and second priority information of the second service.

9. The first terminal device of claim 8, wherein the first resource information comprises first priority information of the first service, and wherein the second resource information comprises second priority information of the second service.

10. The first terminal device of claim 8, wherein the information of the first resource comprises at least one of:
   an index of the first resource; or
   time-frequency location information of the first resource.

11. The first terminal device of claim 8, wherein the processor is further configured to execute the instructions to cause the first terminal device to further determine the second signal strength threshold based on first priority information of the first service and second priority information of the second service.

12. The first terminal device of claim 8, wherein the first signal strength threshold comprises at least one of the following: a signal strength threshold of a service with a highest priority in the first service and the second service; a signal strength threshold of a service with a smallest difference between a signal strength threshold and signal strength in the first service and the second service; or a minimum signal strength threshold in signal strength thresholds of the first service and the second service.

13. The first terminal device of claim 8, wherein the second signal strength threshold comprises at least one of the following: a signal strength threshold of a service with a highest priority in the first service and the second service; a signal strength threshold of a service with a smallest difference between a signal strength threshold and signal strength in the first service and the second service; or a minimum signal strength threshold in signal strength thresholds of the first service and the second service.

14. The first terminal device of claim 8, wherein the first service and the second service are sidelink transmission services.

15. A computer program product comprising computer-executable instructions that are stored on a non-transitory computer readable medium and that, when executed by a processor, cause a first terminal device to:
   receive, from a plurality of second terminal devices, first resource information of a first service and second resource information of a second service, wherein each of the first resource information and the second resource information comprises information of a first resource, wherein the first resource is jointly reserved by the first service and the second service;
   either:
      determine, based on the first resource information and the second resource information, a first signal strength threshold corresponding to the first service, a first signal strength of the first resource information, and a first candidate resource set for determining a resource for transmission, wherein the first candidate resource set does not comprise the first resource when the first signal strength is greater than the first signal strength threshold; or
      determine, based on the first resource information and the second resource information, a second signal strength threshold corresponding to the second service, a second signal strength of the second resource information, and a second candidate resource set, wherein the second candidate resource set does not comprise the first resource when the second signal strength is greater than the second signal strength threshold; and determine the first signal strength threshold based on first priority information of the first service and second priority information of the second service.

16. The computer program product of claim 15, wherein the information of the first resource comprises at least one of:
an index of the first resource; or
time-frequency location information of the first resource.

17. The computer program product of claim 15, wherein the computer-executable instructions further cause the first terminal device to further determine the second signal strength threshold based on first priority information of the first service and second priority information of the second service.

18. The computer program product of claim 15, wherein the first signal strength threshold comprises at least one of the following: a signal strength threshold of a service with a highest priority in the first service and the second service; a signal strength threshold of a service with a smallest difference between a signal strength threshold and signal strength in the first service and the second service; or a minimum signal strength threshold in signal strength thresholds of the first service and the second service.

19. The computer program product of claim 15, wherein the second signal strength threshold comprises at least one of the following: a signal strength threshold of a service with a highest priority in the first service and the second service; a signal strength threshold of a service with a smallest difference between a signal strength threshold and signal strength in the first service and the second service; or a minimum signal strength threshold in signal strength thresholds of the first service and the second service.

20. The computer program product of claim 15, wherein the first service and the second service are sidelink transmission services.

\* \* \* \* \*